US012647972B2

(12) United States Patent
Ryu et al.

(10) Patent No.: US 12,647,972 B2
(45) Date of Patent: Jun. 2, 2026

(54) COHERENT UL MIMO WITH PUSCH DMRS BASED CHANNEL SOUNDING

(71) Applicant: QUALCOMM Incorporated, San Diego, CA (US)

(72) Inventors: Jae Ho Ryu, San Diego, CA (US); Gokul Sridharan, Sunnyvale, CA (US); Hari Sankar, San Diego, CA (US); Rebecca Wen-Ling Yuan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/334,316

(22) Filed: Jun. 13, 2023

(65) Prior Publication Data

US 2024/0422774 A1 Dec. 19, 2024

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 72/232* (2023.01); *H04W 72/51* (2023.01)

(58) Field of Classification Search
CPC ........... H04W 72/1268; H04W 72/232; H04W 72/51; H04L 5/0051; H04L 25/0226; H04B 7/0456
See application file for complete search history.

(56) References Cited

U.S. PATENT DOCUMENTS

| | | | |
|---|---|---|---|
| 2015/0055576 A1* | 2/2015 | Zhang | H04L 5/0094 370/329 |
| 2019/0327693 A1* | 10/2019 | Rahman | H04W 52/42 |

(Continued)

FOREIGN PATENT DOCUMENTS

| | | |
|---|---|---|
| CN | 102332970 A | 1/2012 |
| WO | 2023081107 A1 | 5/2023 |

OTHER PUBLICATIONS

Huawei, et al., "Sounding Using DMRS", R1-105145, 3GPP TSG RAN WG1 meeting #62bis, 3rd Generation Partnership Project Gpp), Mobile Competence Centre, 650, Route Des Lucioles, F-06921 Sophia-Antipolis Cedex, France, vol. RAN WG1, No. Xi'an China, 11-15th, Oct. 11, 2010, Oct. 5, 2010, 2 Pages, XP050450364.

(Continued)

*Primary Examiner* — Rina C Pancholi

(74) *Attorney, Agent, or Firm* — Procopio, Cory, Hargreaves & Savitch LLP

(57) ABSTRACT

Aspects presented herein may enable a base station to perform demodulation reference signal (DMRS)-based channel sounding for a channel between the base station and a UE, such that the base station may configure a more suitable precoding for coherent UL multiple input multiple output (MIMO) transmission(s) of the UE without increasing communication overhead significantly or at all. In one aspect, a base station performs channel sounding for a channel based on a set of physical uplink shared channel (PUSCH) DMRS received from a UE via the channel. The base station selects a precoding to be used by the UE for a subsequent PUSCH transmission via the channel based on the channel sounding. The base station transmits, for the UE via a physical downlink control channel (PDCCH), a transmit precoder matrix indicator (TPMI) indicating the selected (Continued)

1500 precoding, where the PDCCH schedules the subsequent
PUSCH transmission for the UE.

28 Claims, 17 Drawing Sheets

(51) Int. Cl.
  *H04W 72/232*        (2023.01)
  *H04W 72/51*         (2023.01)

(56)                References Cited

U.S. PATENT DOCUMENTS

2020/0382181 A1*  12/2020  Wang ................... H04B 7/0404
2021/0281448 A1*   9/2021  Li ......................... H04W 72/21
2021/0352596 A1*  11/2021  Liu .................... H04W 52/146

OTHER PUBLICATIONS

International Search Report and Written Opinion—PCT/US2024/
029684—ISA/EPO—Sep. 16, 2024.

* cited by examiner $$P_{\text{PUSCH},b,f,c}(i,j,q_d,l) = \min \begin{cases} P_{\text{CMAX},f,c}(i), \\ P_{\text{O\_PUSCH},b,f,c}(j) + 10\log_{10}\left(2^{\mu} \cdot M_{\text{RB},b,f,c}^{\text{PUSCH}}(i)\right) + \alpha_{b,f,c}(j) \cdot PL_{b,f,c}(q_d) + \Delta_{\text{TF},b,f,c}(i) + f_{b,f,c}(i,l) \end{cases} \; [\text{dBM}]$$

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

1102

1200

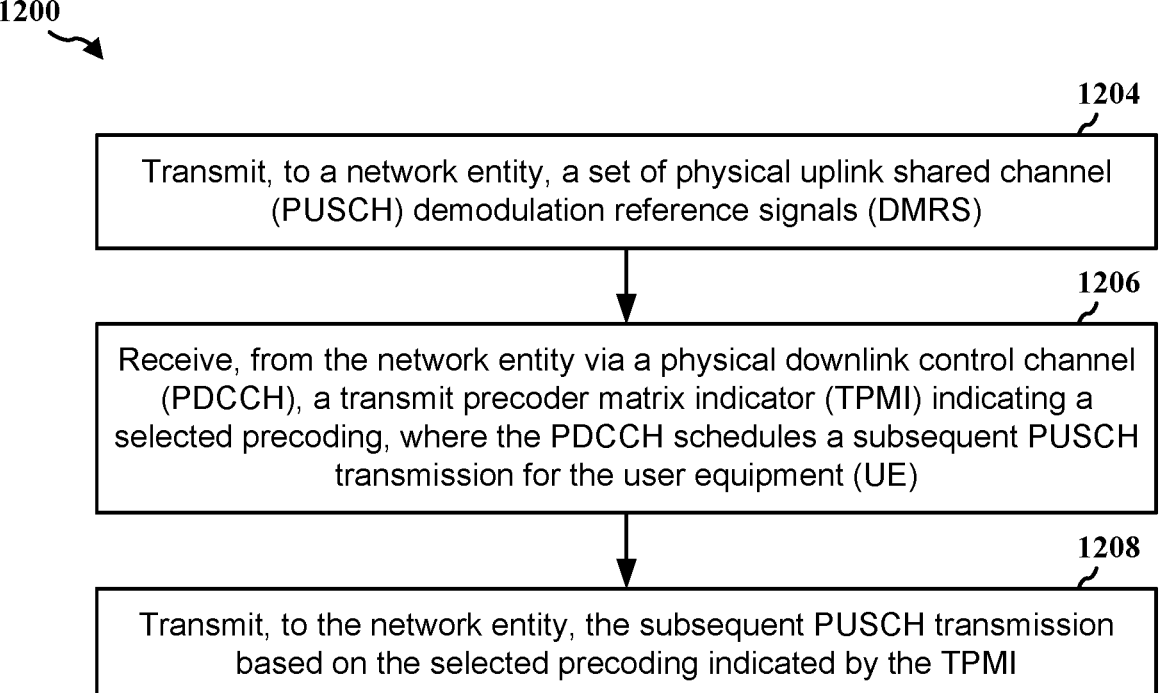

1204

Transmit, to a network entity, a set of physical uplink shared channel (PUSCH) demodulation reference signals (DMRS)

1206

Receive, from the network entity via a physical downlink control channel (PDCCH), a transmit precoder matrix indicator (TPMI) indicating a selected precoding, where the PDCCH schedules a subsequent PUSCH transmission for the user equipment (UE)

1208

Transmit, to the network entity, the subsequent PUSCH transmission based on the selected precoding indicated by the TPMI

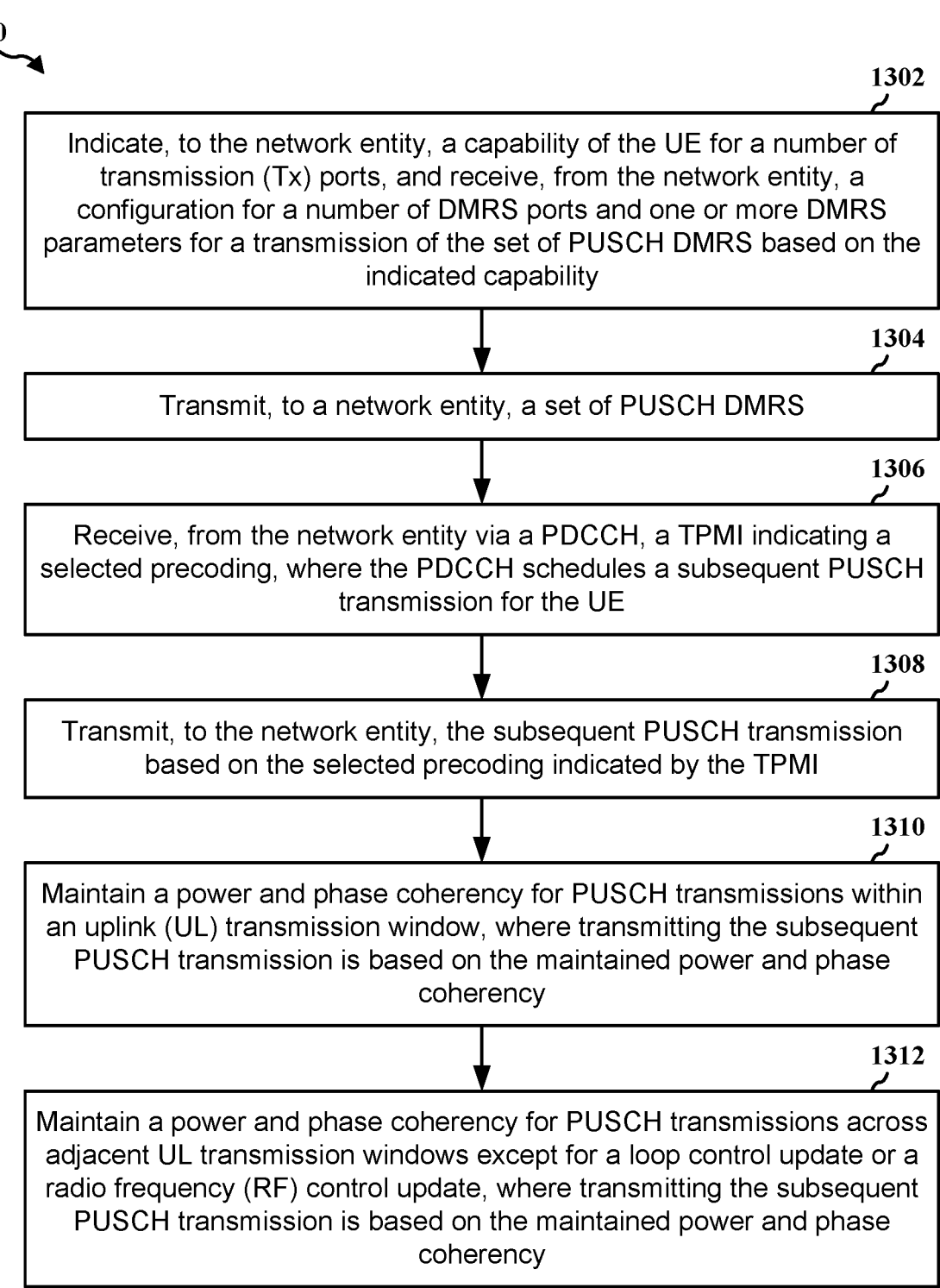

1302

Indicate, to the network entity, a capability of the UE for a number of transmission (Tx) ports, and receive, from the network entity, a configuration for a number of DMRS ports and one or more DMRS parameters for a transmission of the set of PUSCH DMRS based on the indicated capability

1304

Transmit, to a network entity, a set of PUSCH DMRS

1306

Receive, from the network entity via a PDCCH, a TPMI indicating a selected precoding, where the PDCCH schedules a subsequent PUSCH transmission for the UE

1308

Transmit, to the network entity, the subsequent PUSCH transmission based on the selected precoding indicated by the TPMI

1310

Maintain a power and phase coherency for PUSCH transmissions within an uplink (UL) transmission window, where transmitting the subsequent PUSCH transmission is based on the maintained power and phase coherency

1312

Maintain a power and phase coherency for PUSCH transmissions across adjacent UL transmission windows except for a loop control update or a radio frequency (RF) control update, where transmitting the subsequent PUSCH transmission is based on the maintained power and phase coherency

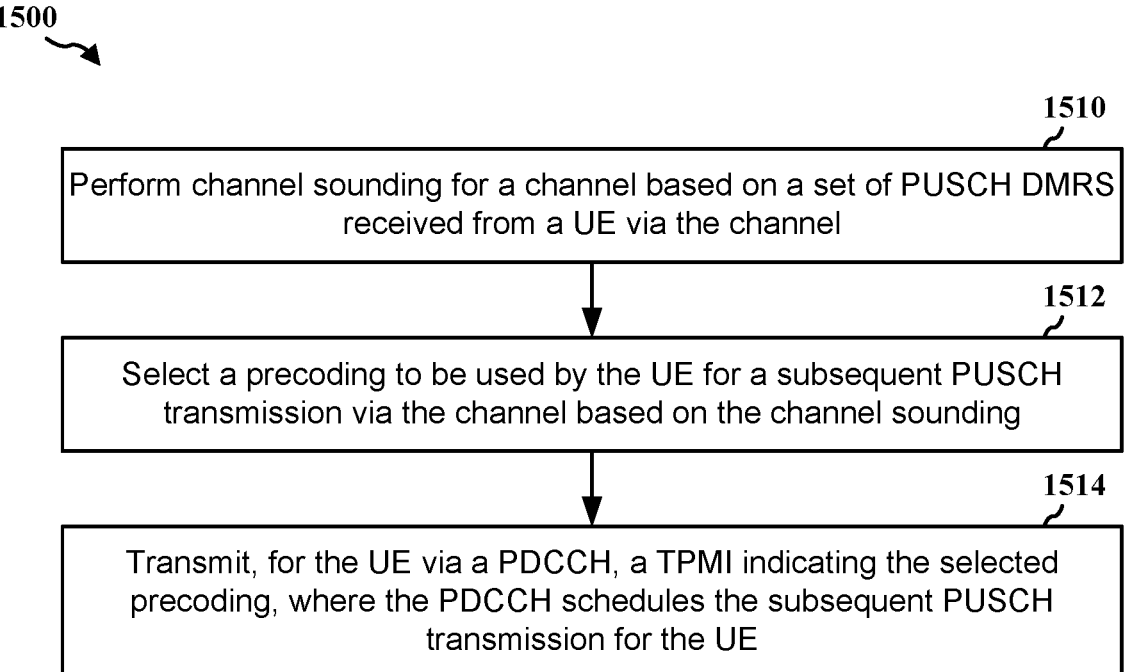

1510

Perform channel sounding for a channel based on a set of PUSCH DMRS received from a UE via the channel

1512

Select a precoding to be used by the UE for a subsequent PUSCH transmission via the channel based on the channel sounding

1514

Transmit, for the UE via a PDCCH, a TPMI indicating the selected precoding, where the PDCCH schedules the subsequent PUSCH transmission for the UE

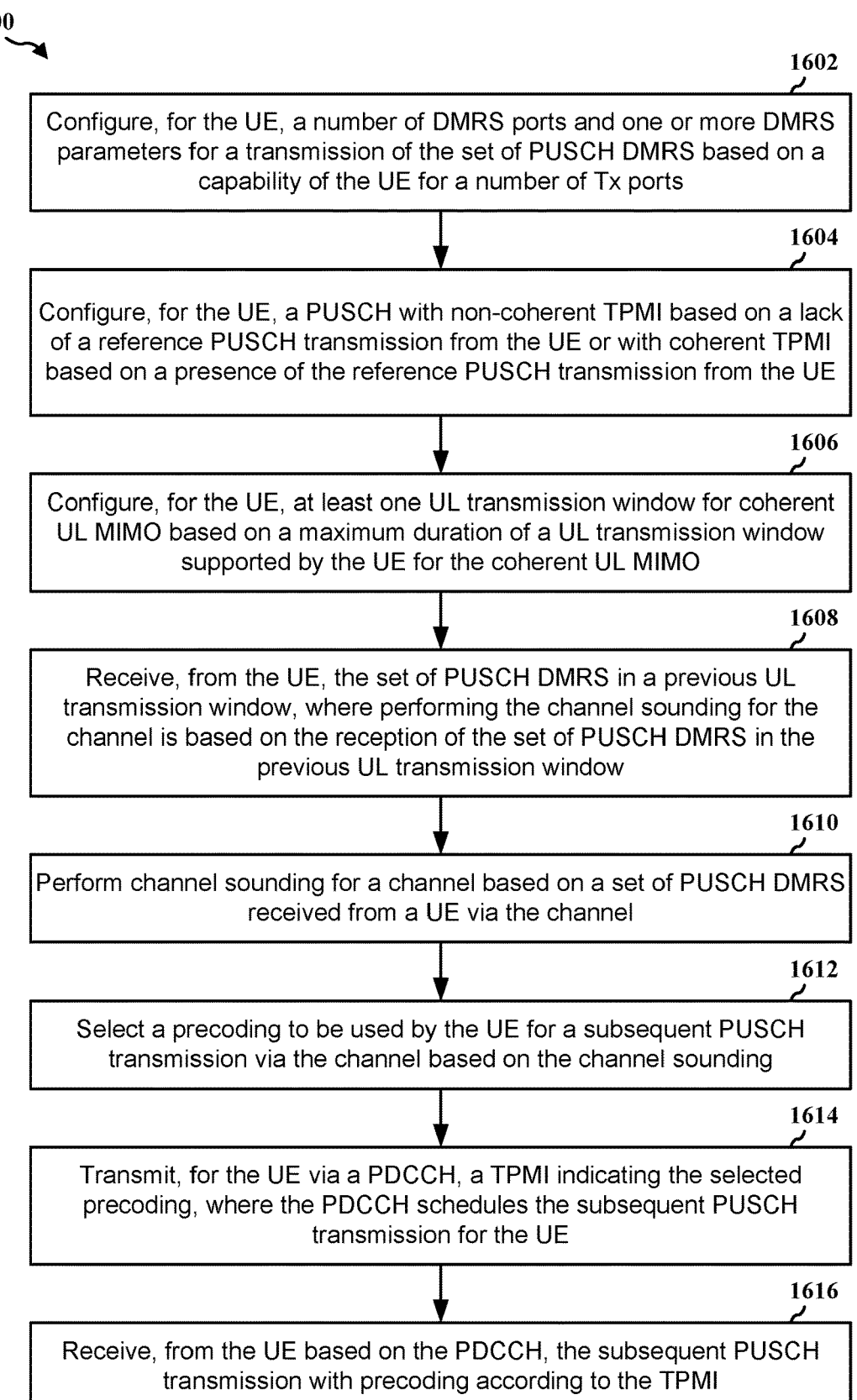

1602

Configure, for the UE, a number of DMRS ports and one or more DMRS parameters for a transmission of the set of PUSCH DMRS based on a capability of the UE for a number of Tx ports

1604

Configure, for the UE, a PUSCH with non-coherent TPMI based on a lack of a reference PUSCH transmission from the UE or with coherent TPMI based on a presence of the reference PUSCH transmission from the UE

1606

Configure, for the UE, at least one UL transmission window for coherent UL MIMO based on a maximum duration of a UL transmission window supported by the UE for the coherent UL MIMO

1608

Receive, from the UE, the set of PUSCH DMRS in a previous UL transmission window, where performing the channel sounding for the channel is based on the reception of the set of PUSCH DMRS in the previous UL transmission window

1610

Perform channel sounding for a channel based on a set of PUSCH DMRS received from a UE via the channel

1612

Select a precoding to be used by the UE for a subsequent PUSCH transmission via the channel based on the channel sounding

1614

Transmit, for the UE via a PDCCH, a TPMI indicating the selected precoding, where the PDCCH schedules the subsequent PUSCH transmission for the UE

1616

Receive, from the UE based on the PDCCH, the subsequent PUSCH transmission with precoding according to the TPMI

FIG. 16

COHERENT UL MIMO WITH PUSCH DMRS BASED CHANNEL SOUNDING

TECHNICAL FIELD

The present disclosure relates generally to communication systems, and more particularly, to a wireless communication involving channel sounding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus performs channel sounding for a channel based on a set of physical uplink shared channel (PUSCH) demodulation reference signals (DMRS) received from a user equipment (UE) via the channel. The apparatus selects a precoding to be used by the UE for a subsequent PUSCH transmission via the channel based on the channel sounding. The apparatus transmits, for the UE via a physical downlink control channel (PDCCH), a transmit precoder matrix indicator (TPMI) indicating the selected precoding, where the PDCCH schedules the subsequent PUSCH transmission for the UE.

In an aspect of the disclosure, a method, a computer-readable medium, and an apparatus are provided. The apparatus transmits, to a network entity, a set of PUSCH DMRS. The apparatus receives, from the network entity via a PDCCH, a TPMI indicating a selected precoding, where the PDCCH schedules a subsequent PUSCH transmission for the apparatus. The apparatus transmits, to the network entity, the subsequent PUSCH transmission based on the selected precoding indicated by the TPMI.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a diagram illustrating an example equation for calculating the transmission (Tx) power of a DMRS-only PUSCH in accordance with various aspects of the present disclosure.

FIG. 12 is a flowchart of a method of wireless communication.

FIG. 13 is a flowchart of a method of wireless communication.

FIG. 15 is a flowchart of a method of wireless communication.

FIG. 16 is a flowchart of a method of wireless communication.

DETAILED DESCRIPTION

Figure 1:
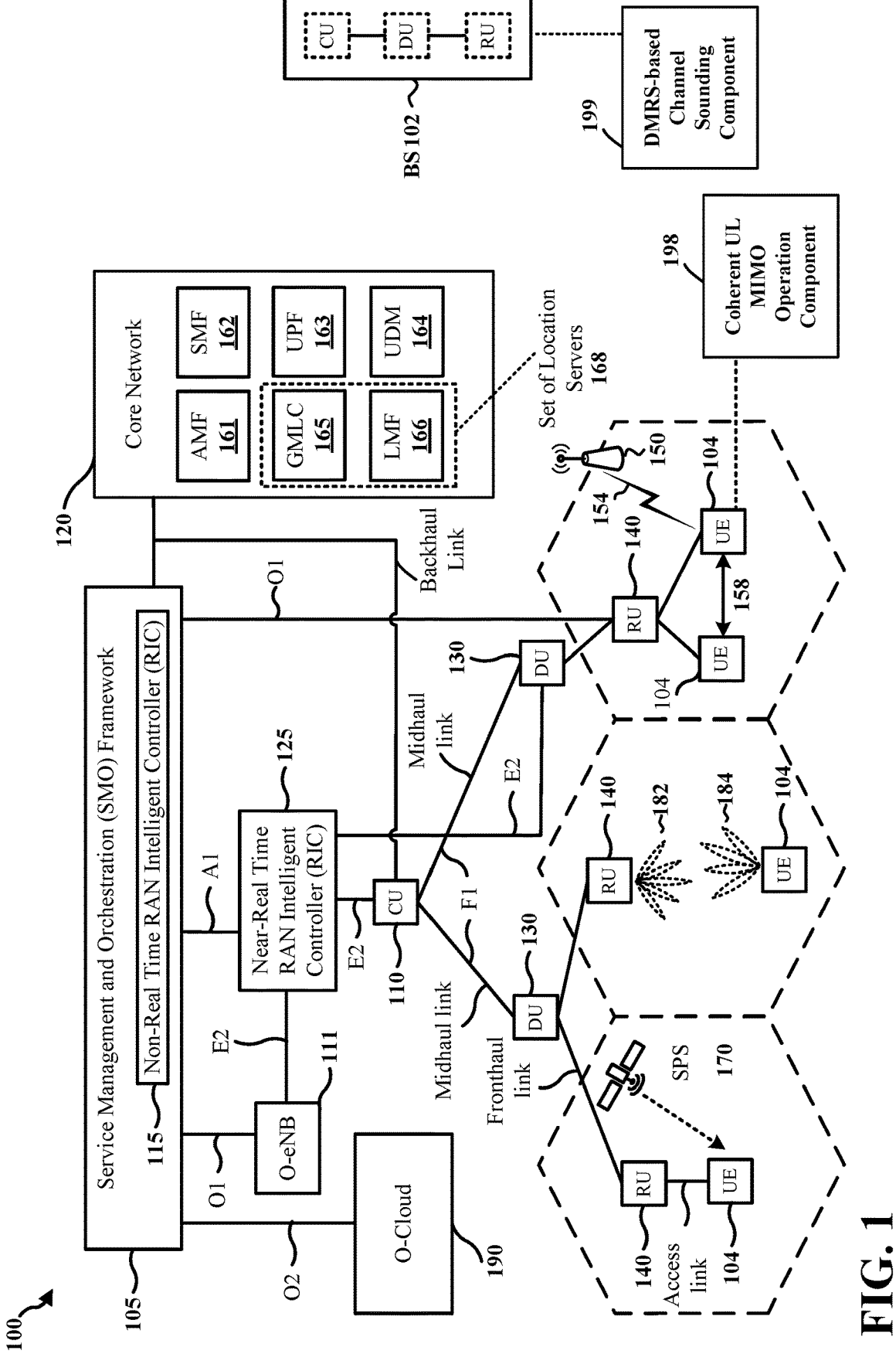
FIG. 1 is a diagram illustrating an example of a wireless communications system and an access network.

Aspects presented herein may improve the performance of wireless communication by enabling a user equipment (UE) to more likely perform and/or maintain coherent uplink (UL) multiple input multiple output (MIMO) operation(s)/transmission(s). Aspects presented herein may enable a network entity, such as a base station, to perform channel sounding for a channel between the network entity and a UE more frequently without increasing communication overhead significantly or at all, thereby enabling the network entity to configure a more suitable precoding for UL transmission(s) of the UE. As such, the transmission of the reference signals (for channel sounding) and the UL transmission(s) at the UE is more likely to correlate.

For example, in one aspect of the present disclosure, physical uplink shared channel (PUSCH) demodulation reference signals (DMRS) from a UE may be used by a network entity for performing channel sounding (e.g., UL sounding) instead of using SRSs. Such configuration may shorten the turn-around time between the channel sounding and PUSCH transmission(s), and the channel sounding overhead based on sounding reference signal (SRS) may also be reduced or eliminated. In addition, the shortened turn-around time may also enable the UE to maintain power and phase coherency for coherent UL MIMO operation(s)/transmission(s) more likely.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE

104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a coherent UL MIMO operation component 198 that may be configured to transmit, to a network entity, a set of PUSCH DMRS; receive, from the network entity via a PDCCH, a TPMI indicating a selected precoding, where the PDCCH schedules a subsequent PUSCH transmission for the UE; and transmit, to the network entity, the subsequent PUSCH transmission based on the selected precoding indicated by the TPMI. In certain aspects, the base station 102 may include a DMRS-based channel sounding component 199 that may be configured to perform channel sounding for a channel based on a set of PUSCH DMRS received from a UE via the channel; select a precoding to be used by the UE for a subsequent PUSCH transmission via the channel based on the channel sounding; and transmit, for the UE via a PDCCH, a TPMI indicating the selected precoding, where the PDCCH schedules the subsequent PUSCH transmission for the UE.

Figures 2A, 2B, 2C, 2D:
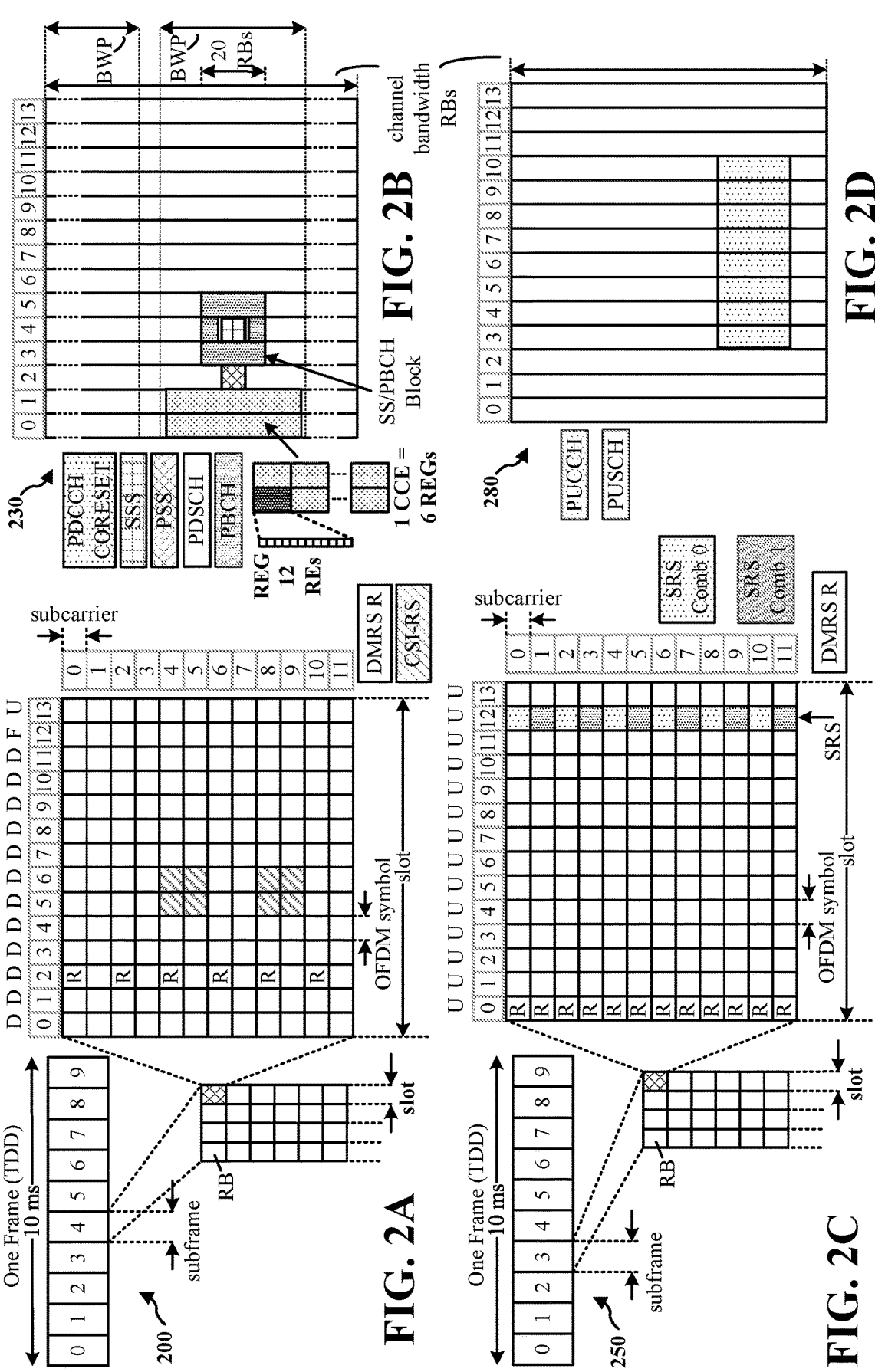
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |

TABLE 1-continued

Numerology, SCS, and CP

| μ | SCS $\Delta f = 2^\mu \cdot 15$[kHz] | Cyclic prefix |
|---|---|---|
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
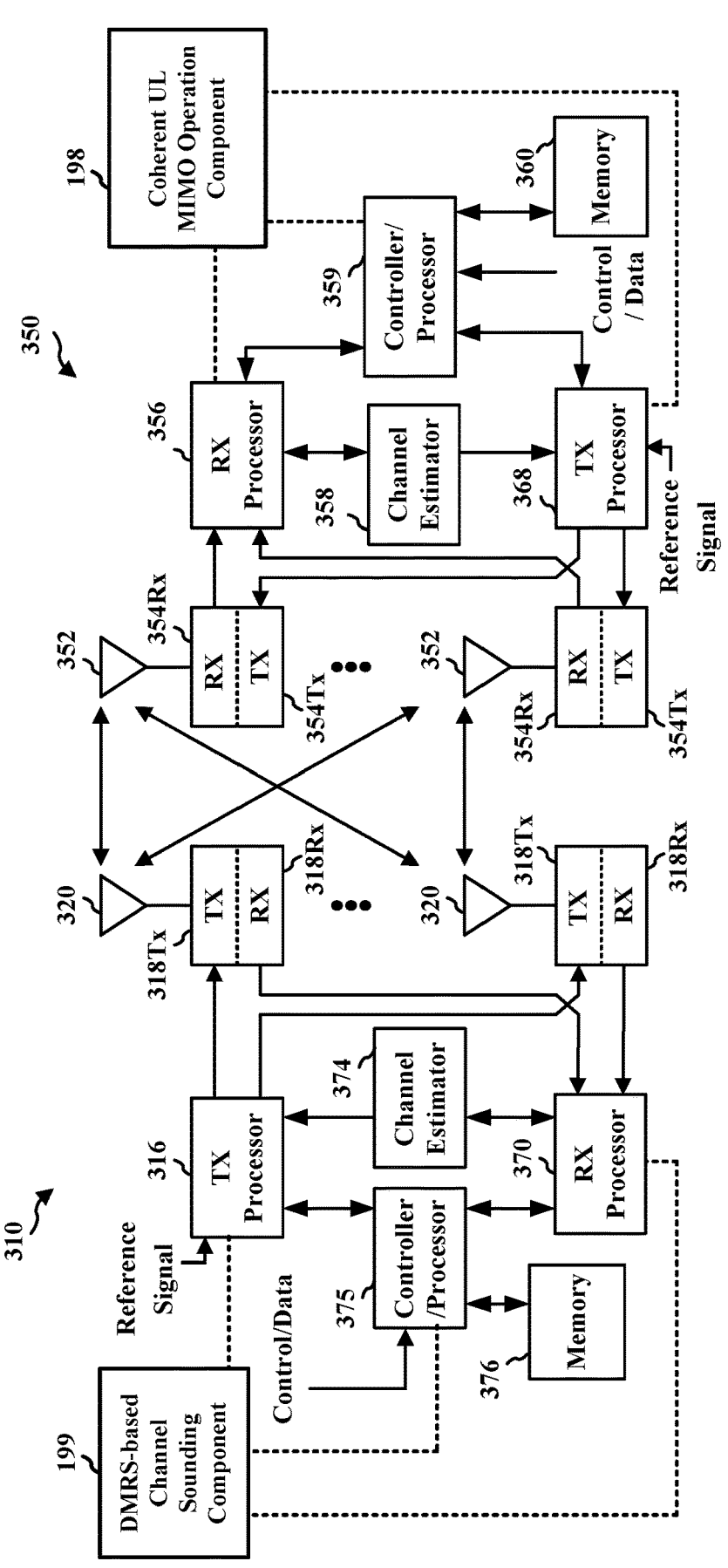
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the coherent UL MIMO operation component 198 of FIG. 1.

At least one of the TX processor 316, the RX processor 370, and the controller/processor 375 may be configured to perform aspects in connection with the DMRS-based channel sounding component 199 of FIG. 1.

Figure 4:
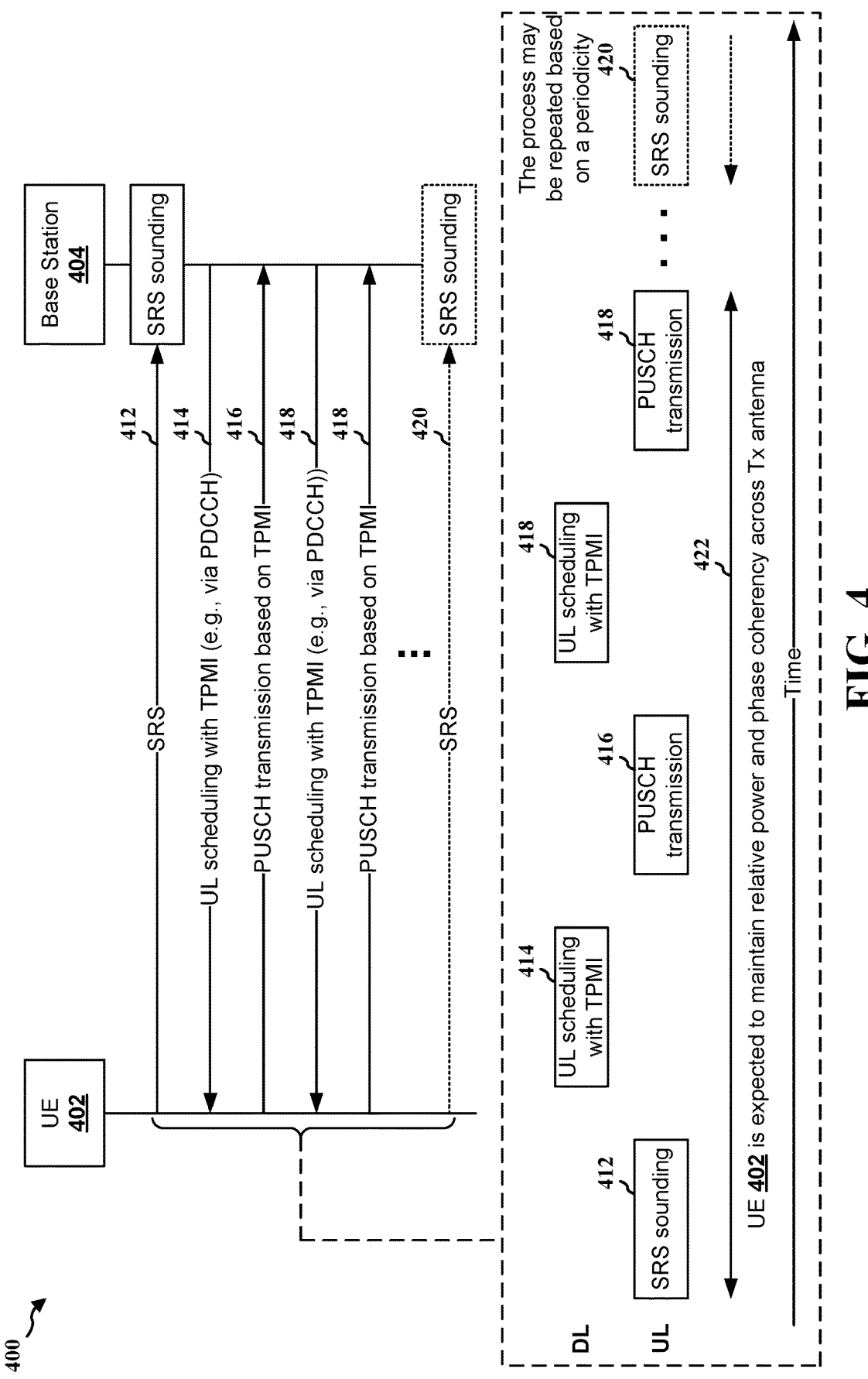
FIG. 4 is a diagram illustrating an example of codebook-based coherent UL multiple input multiple output (MIMO) operation in accordance with aspects of the present disclosure.

FIG. 4 is a diagram 400 illustrating an example of codebook-based coherent uplink (UL) multiple input multiple output (MIMO) operation in accordance with aspects of the present disclosure. In some scenarios, a user equipment (UE) may be communicating with a base station (which may also be referred to as a "network node" and/or a "network entity" in some examples) using multiple transmission (Tx) antennas (which may also be referred to as "antenna port(s)"). Based on measuring the reference signals (RSs) transmitted from the UE, the base station may determine a precoding to be used by the UE for one or more UL transmissions (e.g., transmissions from the UE to the base station). For purposes of the present disclosure, a precoding may refer to application of phase and gain weighting to the UL transmission from each Tx antennas to support multi-stream (or multi-layer) transmission in multi-antenna wireless communications. In single-stream precoding, the same signal is emitted from each of the transmit antennas with appropriate weighting (phase and gain) such that the signal power is maximized at the receiver output. When the receiver has multiple antennas, single-stream precoding may not maximize the throughput. Thus, to maximize the throughput in multiple receive antenna systems, multi-stream precoding is generally specified.

For example, as shown at 412, a UE 402 communicating with a base station 404 may be configured to transmit, to the base station 404, a set of sounding reference signals (SRS) periodically via multiple Tx antennas (e.g., with a transmission periodicity of 20 ms, 40 ms, 80 ms, etc.). The base station 404 may measure the set of SRS transmitted from the UE 402, and the base station 404 may determine a precoding to be used by the UE 402 for transmitting one or more physical uplink shared channel (PUSCH) transmissions (i.e., the UL transmissions) based on the measurements for the set of SRSs (which may be referred to as "SRS measurements" and/or "SRS channel sounding"). For purposes of the present disclosure, channel sounding may refer to a technique/process that measures the channel characteristics for MIMO wireless communication. To maximize the throughput of the MIMO wireless communication, a transmitting entity may use channel sounding to process the multidimensional spatial-temporal signal and estimate channel characteristics.

At 414, after the base station 404 determines the precoding, the base station 404 may schedule a PUSCH transmission for the UE 402 (which may also be referred to as "UL scheduling"), where the UL scheduling may include an SRS resource indicator (SRI) or a transmit precoding matrix indicator (TPMI) that indicates the precoding determined by the base station 404. The base station 404 may schedule the PUSCH transmission via a physical downlink control channel (PDCCH) (which may also be referred to as downlink control information (DCI) and/or scheduling DCI).

At 416, based on the UL scheduling with the SRI/TPMI, the UE 402 may transmit a PUSCH transmission using the precoding indicated by the SRI/TPMI in the scheduling DCI. As shown at 418, the process of UL scheduling and corresponding PUSCH transmission process may repeat for more than once. For example, after the PUSCH transmission at 416, the base station 404 may schedule another PUSCH transmission for the UE 402 via another PDCCH (also includes a determined precoding in an SRI/TPMI), and the UE 402 may transmit another PUSCH transmission accordingly (e.g., using the precoding indicated by the SRI/TPMI).

As shown at 420, after a period of time or based on a periodicity, the base station 404 may be configured to measure another set of SRSs transmitted from the UE 402 (e.g., to ensure the channel sounding is up to date), and repeat the processes described in connection with 412, 416, and 418. As shown at 422, in some implementations, the UE 402 may be specified/configured to maintain relative power and phase coherency across its Tx antennas for the UL MIMO operation.

In some examples, an UL MIMO operation may be coherent (which may be referred to as coherent UL MIMO or a coherent UL MIMO operation/transmission) or non-coherent (which may be referred to as non-coherent UL MIMO or a non-coherent UL MIMO operation/transmission). When a UE (e.g., the UE 402) is capable of maintaining a phase and power coherency across its Tx antennas between SRS sounding and PUSCH transmission (e.g., as shown at 422 of FIG. 4), a base station (e.g., the base station

404) may schedule PUSCH with TPMI for coherent UL MIMO as shown by Table 2 and Table 3 below. On the other hand, if the UE is not capable of maintaining a phase and power coherency across its Tx antennas between SRS sounding and PUSCH transmission, then the base station may be specified to schedule PUSCH with TPMI for non-coherent UL MIMO as shown by Table 2 and Table 3 below.

TABLE 2

Example precoding matrix w for single-layer transmission using two antenna ports.

| | W (ordered from left to right in increasing order of TPMI index) | | | | |
|---|---|---|---|---|---|
| TPMI index | For non-coherent UL MIMO | | For coherent UL MIMO | | — — |
| 0-5 | $\frac{1}{\sqrt{2}}\begin{bmatrix}1\\0\end{bmatrix}$ $\quad\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

TABLE 3

Example precoding matrix w for two-layer transmission using two antenna ports with transform precoding disabled.

| | W (ordered from left to right in increasing order of TPMI index) | | |
|---|---|---|---|
| TPMI index | For non-coherent UL MIMO | For coherent UL MIMO | |
| 0-2 | $\frac{1}{\sqrt{2}}\begin{bmatrix}1&0\\0&1\end{bmatrix}$ | $\frac{1}{2}\begin{bmatrix}1&1\\1&-1\end{bmatrix}$ | $\frac{1}{2}\begin{bmatrix}1&1\\j&-j\end{bmatrix}$ |

In some scenarios, it may be challenging for maintaining/configuring a coherent UL MIMO operation. For example, the channel between SRS sounding (e.g., as shown at 412 of FIG. 4) and one or more PUSCH transmissions (e.g., as shown at 416 of FIG. 4) may decorrelate if the SRS periodicity is large (e.g., 80 ms) and/or if the channel fading is fast (e.g., when the UE is in a dynamic environment or is moving at a fast speed, etc.). In other words, the channel condition may have changed significantly between the SRS transmission and the one or more PUSCH transmissions. In addition, for the radio frequency (RF) chain of a UE to maintain a power and phase coherency across multiple antenna ports between the SRS sounding and the one or more PUSCH transmissions, the UE may be specified/configured to disable any loop/RF control update to maintain the power and phase coherency, which may be very challenging for the UE and/or may affect other functionality of the UE.

Aspects presented herein may improve the performance of wireless communication by enabling a UE to more likely perform and/or maintain coherent UL MIMO operation(s)/transmission(s). Aspects presented herein may enable a network entity, such as a base station, to perform channel sounding for a channel between the network entity and a UE more frequently without increasing communication overhead significantly or at all, thereby enabling the network entity to configure a more suitable precoding for UL transmission(s) of the UE. As such, the transmission of the reference signals (for channel sounding) and the UL transmission(s) at the UE is more likely to correlate. For example, in one aspect of the present disclosure, physical uplink shared channel (PUSCH) demodulation reference signals (DMRS) from a UE may be used by a network entity for performing channel sounding (e.g., UL sounding) instead of using SRSs. Such configuration may shorten the turn-around time between the channel sounding and PUSCH transmission(s), and the channel sounding overhead based on SRS may also be reduced or eliminated. In addition, the shortened turn-around time may also enable the UE to maintain power and phase coherency for coherent UL MIMO operation(s)/transmission(s) more likely.

Figure 5:
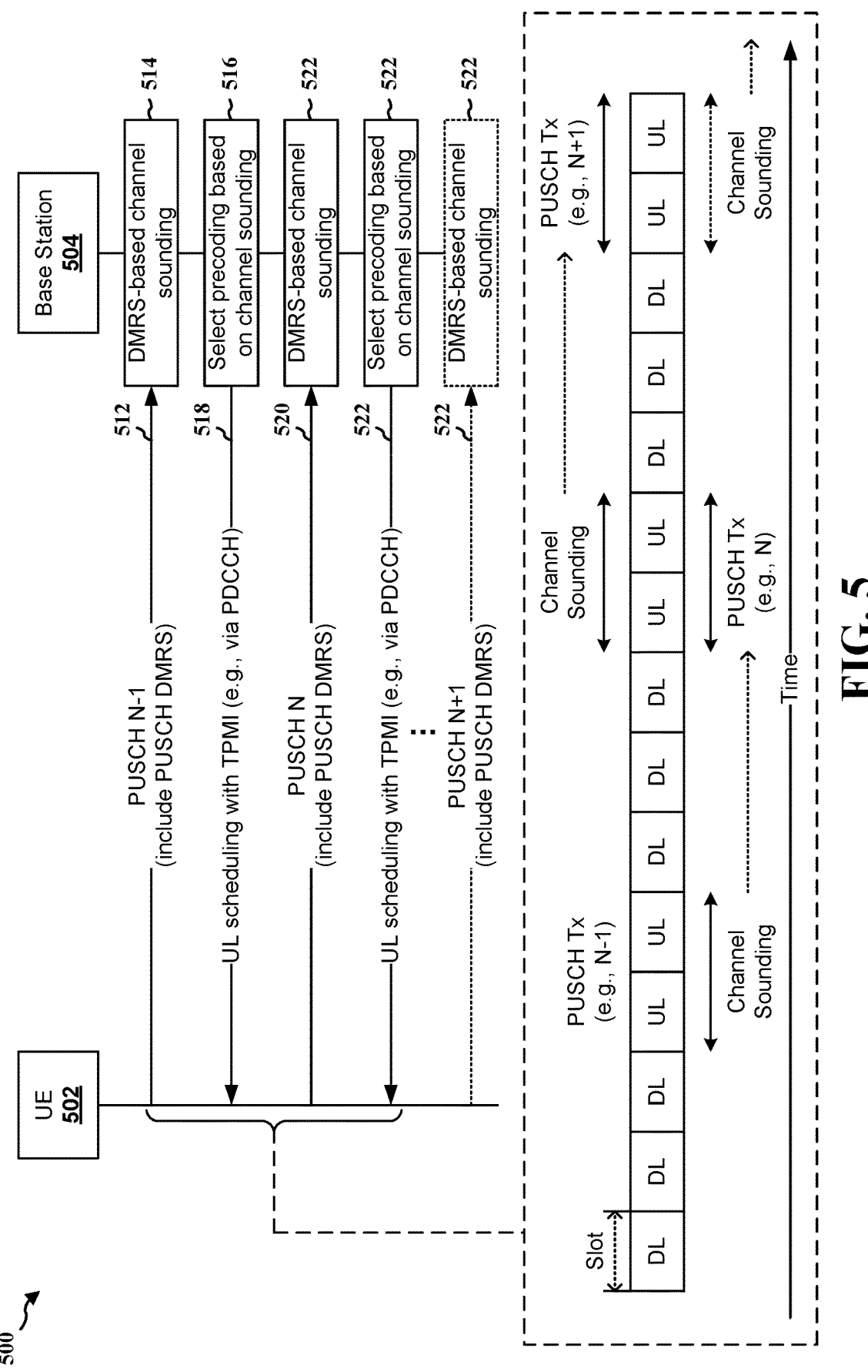
FIG. 5 is a communication flow illustrating an example of coherent UL MIMO with demodulation reference signals (DMRS)-based channel sounding in accordance with various aspects of the present disclosure.

FIG. 5 is a communication flow 500 illustrating an example of coherent UL MIMO with DMRS-based channel sounding (which may be referred to as "DMRS-based coherent UL MIMO" in some examples) in accordance with various aspects of the present disclosure. The numberings associated with the communication flow 500 do not specify a particular temporal order and are merely used as references for the communication flow 500. Aspects presented herein may enable a network node (e.g., a base station) to perform channel sounding based on PUSCH DMRS (which may be referred to as "DMRS channel sounding" and/or "DMRS-based channel sounding") transmitted from a UE in a previous UL transmission window (e.g., in a previous PUSCH transmission). Then, the network entity may determine a precoding to be used for one or more PUSCH transmissions (e.g., a subsequent PUSCH transmission of the UE) based on the DMRS channel sounding, and schedule the PUSCH transmission for the UE via a PDCCH (e.g., via the TPMI indication in scheduling DCI). In response, the UE may transmit the scheduled PUSCH transmission using the precoding determined by the network entity (e.g., based on the TPMI indicated in the scheduling DCI).

For example, as shown at 512, a UE 502 communicating with a base station 504 (which may be referred to as a "network node" or a "network entity" in some examples) via a channel may be configured to transmit, to the base station 504, a PUSCH (e.g., an (N−1)th PUSCH) that includes a set of PUSCH DMRS via multiple antenna ports. At 514, the base station 504 may measure the set of PUSCH DMRS transmitted from the UE 502 and perform the DMRS-based channel sounding for the channel, and at 516, the base station 504 may determine/select a precoding to be used by the UE 502 (or suitable for the UE 502) for a subsequent PUSCH transmission (e.g., an Nth PUSCH) via the channel based on the measurements for the set of DMRS (which may be referred to as "DMRS measurements"). In some examples, the PUSCH DMRS may also be used by the base station 504 in association with a channel estimation for a PUSCH demodulation.

At 518, after the base station 504 determines/selects the precoding, the base station 504 may schedule the subsequent PUSCH transmission for the UE 502 (which may also be referred to as "UL scheduling"), where the UL scheduling may include a TPMI that indicates the precoding determined/selected by the base station 504. Similarly, the base station 504 may schedule the subsequent PUSCH transmission via a PDCCH/DCI/scheduling DCI.

At 520, based on the UL scheduling with the TPMI, the UE 502 may transmit the subsequent PUSCH transmission using the precoding indicated by the TPMI in the scheduling DCI. As shown at 522, the process of performing DMRS-based channel sounding, the determination/selection of the precoding based on the DMRS-based channel sounding, and the scheduling of the PUSCH with the determined/selected precoding may repeat for more than once. For example, after the UE 502 transmits the PUSCH transmission (e.g., the Nth PUSCH) at 520, the base station 504 may measure and perform the DMRS-based channel sounding based on the PUSCH DMRS in this PUSCH transmission. Then, the base station 504 may determine/select a precoding to be used by the UE 502 (or suitable for the UE 502) for a subsequent PUSCH transmission (e.g., an (N+1)th PUSCH) based on the DMRS measurements.

Aspects discussed in connection with FIG. 5 may provide more benefits compared to the coherent UL MIMO with SRS-based channel sounding as there is more likely a shorter turn-around time between the channel sounding (e.g., the DMRS-based channel sounding) and the PUSCH transmission. In addition, such configuration may not specify a UE (e.g., the UE 502) to transmit SRSs (at least for channel sounding purposes), thereby reducing or eliminating the SRS transmission overhead. In some scenarios, such as cell edge scenarios, the coverage for the DMRS-based channel sounding may be higher/longer compared to the SRS-based channel sounding as the PUSCH DMRS are transmitted within PUSCH resource blocks (RBs) (e.g., the UE may concentrate the transmission power with narrower bandwidth for transmitting PUSCH RBs). Also, the shorter duration between the channel sounding and the PUSCH transmission may be easier to the UE to maintain the power and phase coherency for the coherent UL MIMO operation.

In some examples, for DMRS-based coherent UL MIMO, a UE (e.g., the UE 502) may be specified to transmit DMRS from all of its antenna ports without precoding. In other words, the PUSCH and DMRS transmission from the UE may be considered as non-transparent, where DMRS may be transmitted by the UE without precoding separately from each of its Tx port while PUSCH may be transmitted by the UE with precoding, and the network entity (e.g., the base station 504) may configure the number of DMRS ports and other DMRS parameters for the UE based on the UE's capability on number of Tx ports. On the other hand, transparent PUSCH and DMRS transmission may refer to using same precoding for PUSCH and associated DMRS transmission. In some examples, the UE may indicate its capability on number of Tx ports to the base station. Then, the PUSCH is transmitted with a precoding indicated by TPMI in scheduling DCI as described in connection with FIG. 5. For example, as shown by a diagram 600A of FIG. 6A, if the UE has two Tx antennas and is configured to support the DMRS-based coherent UL MIMO as described in connection with FIG. 5, the UE may be specified to transmit the DMRS from each of two Tx antennas (or antenna ports). Similarly, as shown by a diagram 600B of FIG. 6B, if the UE has four Tx antennas and is configured to support the DMRS-based coherent UL MIMO as described in connection with FIG. 5, the UE may be specified to transmit the DMRS from each of four Tx antennas (or antenna ports). On the other hand, for a transparent PUSCH and DMRS precoding, a UE may transmit the PUSCH DMRS and the PUSCH using the same precoding.

In another aspect of the present disclosure, referring back to FIG. 5, as shown at 512, in some scenarios, the base station 504 may not be able to select/determine a precoding for a first PUSCH transmission (e.g., the (N−1)th PUSCH) from the UE 502 as the base station 504 may not have an opportunity to perform a DMRS-based channel sounding for the first PUSCH transmission (e.g., the base station 504 has not received DMRS from the UE 502). In other words, the first PUSCH transmission may be without a reference PUSCH transmission. As such, in one example, when there is no reference PUSCH transmission (e.g., without a previous PUSCH transmission that carries PUSCH DMRS), the base station 504 may configure the first PUSCH for the UE 502 with a non-coherent TPMI (e.g., a TPMI that indicates a non-coherent precoding), and the UE 502 may be configured to transmit DMRS from all of its Tx antennas/antenna ports irrespective of the PUSCH rank. Table 4 below shows examples of precoding that may be used by the UE 502 for the non-coherent UL MIMO transmission.

TABLE 4

Example precoding matrix for non-coherent UL MIMO
with two antenna ports

| Rank | Precoding | Tx port 0 | Tx port 1 |
|---|---|---|---|
| 1 | $\begin{bmatrix} 1 \\ 0 \end{bmatrix}$ | DMRS port 0 + PUSCH layer 0 | DMRS port 1 |
| 1 | $\begin{bmatrix} 0 \\ 1 \end{bmatrix}$ | DMRS port 0 | DMRS port 1 + PUSCH layer 0 |
| 2 | $\begin{bmatrix} 1 & 0 \\ 0 & 1 \end{bmatrix}$ | DMRS port 0 + PUSCH layer 0 | DMRS port 1 + PUSCH layer 1 |

For example, if the UE 502 is configured with a rank 1 PUSCH transmission, the UE PGP 502 may transmit DMRS and PUSCH on port 0 and just DMRS on port 1, or transmit just DMRS on port 0 and transmit DMRS and PUSCH on port 1, etc. In some examples, for a rank 1 transmission, the UE 502 may also be configured to use other precoding schemes such as space frequency block coding (SFBC) and/or large cyclic delay diversity (CDD) for better/improved power amplifier (PA) utilization.

In another aspect of the present disclosure, for DMRS-based coherent UL MIMO, a UE (e.g., the UE 502) may maintain phase and coherency across UL transmissions (which may also be referred to as UL bursts) when the frequency domain resource allocation (FDRA) of PUSCH is maintained and the transmit power is not changed. As such, a base station (e.g., the base station 504) may be configured to schedule PUSCH(s) for a UE (e.g., the UE 502) based on coherent TPMI when following conditions are met:

(1) FDRA of PUSCH is the same between a reference PUSCH (e.g., the previous PUSCH, the (N−1)th PUSCH, etc. as shown at 512 of FIG. 5) and a scheduled PUSCH (e.g., the current PUSCH, the Nth PUSCH, etc. as shown at 520 of FIG. 5) in terms of the number of physical resource blocks (PRBs) and PRB locations in the bandwidth part (BWP);

(2) Modulation coding scheme (MCS) is not changed between the reference PUSCH and the scheduled PUSCH; and (3) There is no closed-loop power control command between the reference PUSCH the and scheduled PUSCH.

However, the base station may be refrained from scheduling PUSCH(s) for the UE based on coherent TPMI when at least one of the above conditions is not met.

In another aspect, for DMRS-based coherent UL MIMO, a UE (e.g., the UE 502) may be specified to maintain a power and phase coherency for PUSCH transmission(s) within an UL transmission window. In addition, the UE may also be specified to maintain power and phase coherency for PUSCH transmission(s) across adjacent UL transmission windows (except for the case with loop/RF control update). For purposes of the present disclosure, when a UE maintains a power and phase coherence for PUSCH transmission(s), it does not mean the UE is specified to maintain the same power and phase across PUSCH transmission(s). Rather, the UE may be specified to maintain the power and phase (or maintain the power and phase coherency) within a defined margin/range (e.g., as defined in a specification).

However, in certain scenarios/conditions, a UE (e.g., the UE 502) may be allowed/configured to break power and phase coherence across an UL transmission window. In one scenario/condition, if a loop or RF control update is specified/configured for the UE, the UE may be allowed to break the power and phase coherency. For example, in the UL transmission window following the loop/RF control update, the UE may still be configured to apply the indicated TPMI for PUSCH precoding without power and phase continuity with regards to the PUSCH DMRS transmission in a previous UL transmission window. In addition, a maximum number of power and phase coherence breaks (X) over a period of (Y) (e.g., a maximum of two breaks in 3 minutes, etc.) may be defined/configured for the UE (e.g., defined in a specification).

In another scenario/condition, a base station (e.g., the base station 504) may configure, for a UE (e.g., the UE 502), a system frame number (SFN) and/or a slot number with a periodicity of M slots where the UE may break the power and phase coherence for performing loop/RF control update. In some examples, the value for M may be determined based on the UE's capability for a maximum coherency breaking period of P, where M is smaller than or equal to P (e.g., M≤P). Then, the base station may be specified to schedule PUSCH with non-coherent TPMI in these configured coherency breaking slots.

In another aspect of the present disclosure, for DMRS-based coherent UL MIMO, a base station (e.g., the base station 504) may configure an UL transmission window (or the length of the UL transmission window) for the coherent UL MIMO operation based on or subject to the capability of a UE (e.g., the UE 502).

Figure 7:
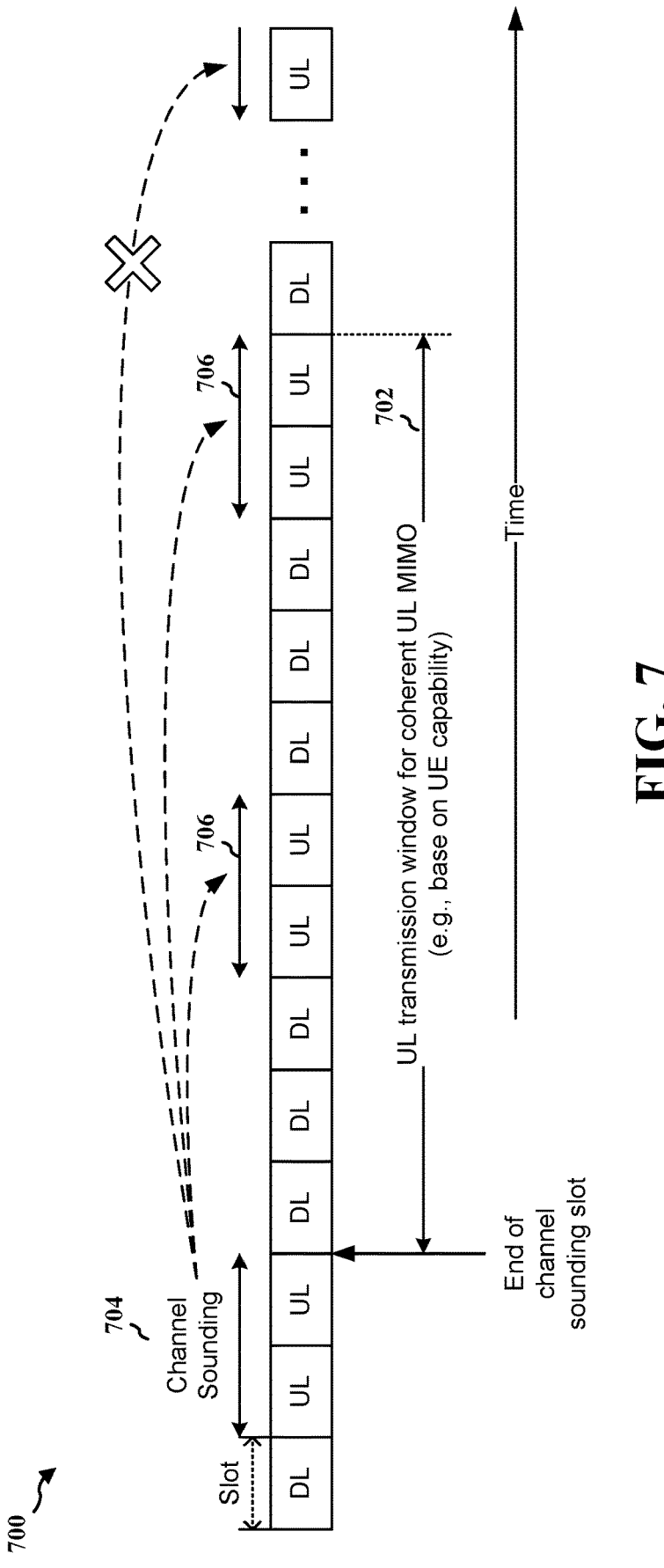
FIG. 7 is a diagram illustrating an example UL transmission window for coherent UL MIMO in accordance with various aspects of the present disclosure.

FIG. 7 is a diagram 700 illustrating an example UL transmission window for coherent UL MIMO in accordance with various aspects of the present disclosure. In one example, as shown at 702, a base station (e.g., the base station 504) may configure a UL transmission window for coherent UL MIMO for a UE (e.g., the UE 502) based on the capability of the UE. For example, a UE with a higher UE capability for power/phase coherency may be configured with a longer UL transmission window compared to a UE with a lower UE capability for power/phase coherency. In addition, the base station may be specified not to configure an UL transmission window for coherent UL MIMO that is larger than the UE capability for maximum UL transmission window for coherent UL MIMO. For example, as shown at 706, if the UE is just capable of maintain power and phase coherency for two UL transmissions/bursts or may support a maximum duration of a UL transmission window after a channel sounding as shown at 704, then the base station may not configure an UL transmission window for coherent UL MIMO that exceeds the capability of the UE or the maximum duration supported by the UE. As such, the UL transmission window for coherent UL MIMO may be extended or shortened based on the UE capability.

While enabling a base station (e.g., the base station 504) to perform channel sounding based on PUSCH DMRS (e.g., the DMRS-based channel sounding) may improve the coherent UL MIMO operation(s)/transmission(s) at a UE (e.g., the UE 502), the DMRS-based channel sounding may be strictly associated with PUSCH transmission(s). Thus, in some scenarios, the base station may not be able to perform the DMRS-based channel sounding if there is no UL data to transmit by the UE (e.g., there is no PUSCH transmission from the UE). In addition, the bandwidth of the DMRS-based channel sounding may be restricted to the scheduled PUSCH bandwidth, and the number of DMRS symbols and transmit power of DMRS symbols may also be linked to the PUSCH allocation and transmit power. On the other hand, as described above, SRS-based channel sounding may not provide a full flexibility for channel sounding (e.g., with a long and/or fixed periodicity). For example, when a UE is configured with a periodic and/or a semi-periodic SRS transmission, a base station may not flexibly control when to perform the channel sounding. In another example, when a UE is configured with an aperiodic SRS transmission, a base station may not have a full flexibility on the sounding channel bandwidth, the number of SRS symbols, and/or SRS transmit power, etc.

As such, in another aspect of the present disclosure, for DMRS-based coherent UL MIMO (or for DMRS-based channel sounding), a UE (e.g., the UE 502) may be configured to transmit a PUSCH that includes just the PUSCH DMRS (e.g., without data), which may be referred to as a "DMRS-only PUSCH" or "DMRS-exclusive PUSCH" for purposes of the present disclosure. In other words, aspects presented herein may enable DMRS-based channel sounding to be dynamically coupled with or decoupled from a PUSCH transmission. As such, a base station may dynamically adapt channel sounding parameter(s), such as in terms of channel sounding bandwidth, number of channel sounding symbols, and/or the Tx power of the channel sounding signal, etc.

Figures 8A, 8B:
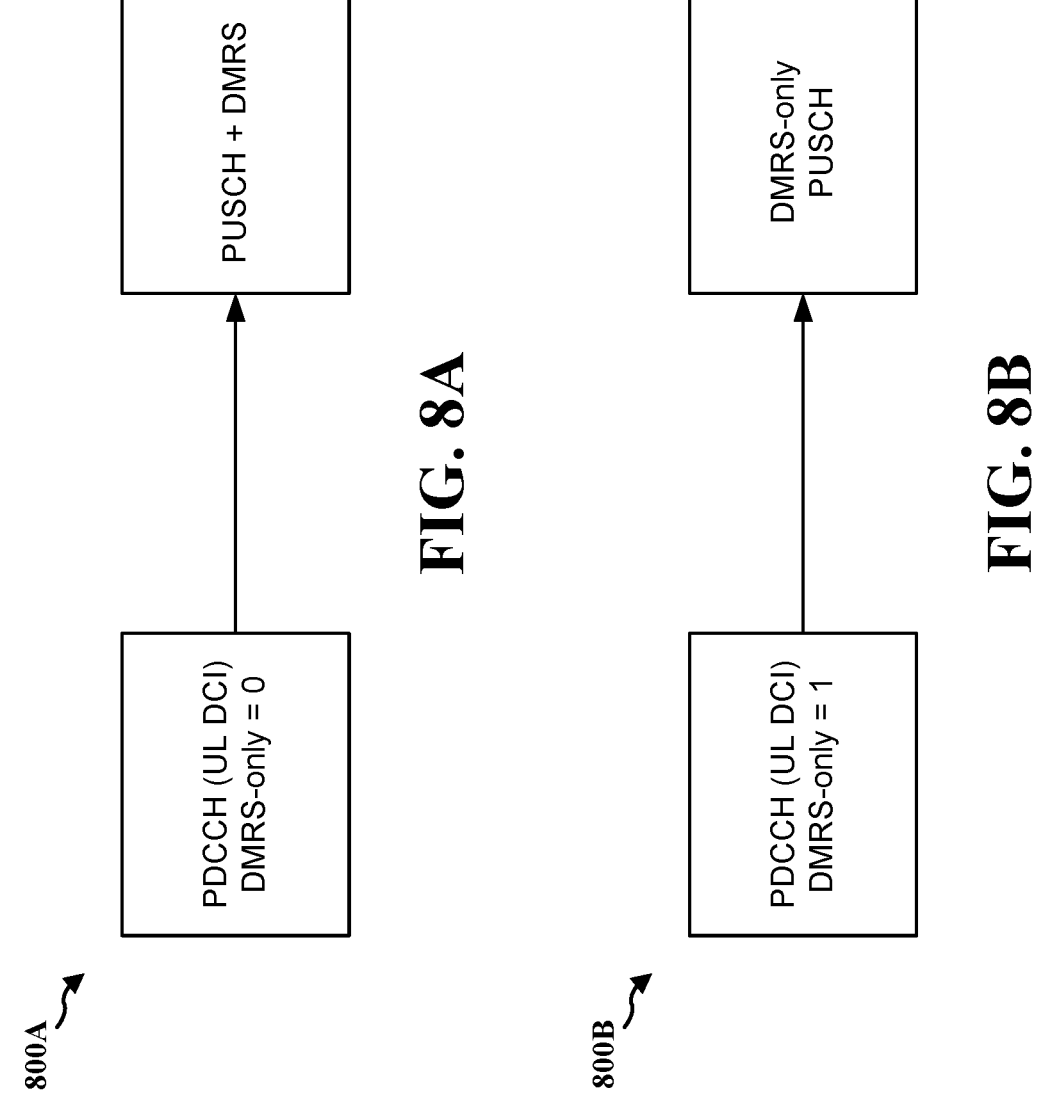
FIG. 8A is a diagram illustrating an example of a base station indicating/configuring a UE to transmit PUSCH and DMRS in accordance with various aspects of the present disclosure.
FIG. 8B is a diagram illustrating an example of a base station indicating/configuring a UE to transmit DMRS-only PUSCH in accordance with various aspects of the present disclosure.

FIGS. 8A and 8B are diagrams 800A and 800B, respectively, illustrating an example of a base station indicating/configuring a UE to transmit DMRS-only PUSCH in accordance with various aspects of the present disclosure. In one example, when coherent UL MIMO with DMRS-based channel sounding is configured for a UE (e.g., the UE 502), a base station (e.g., the base station 504) may specify/configure DMRS-only PUSCH transmission(s) for the UE via UL DCI depending on the implementations, such as when the UE does not have data to transmit. For example, a DMRS-only PUSCH may be scheduled by an UL DCI format (e.g., format 0_0, format 0_1, and/or format 0_2, etc.). In another example, a 1-bit flag/indication may be used to indicate the DMRS-only PUSCH transmission (by a base station to a UE). For example, as shown by the diagram 800A of FIG. 8A, when this 1-bit flag/indication is zero, the UE may be configured to transmit a PUSCH with PUSCH DMRS. On the other hand, as shown by the diagram 800B of FIG. 8B, when this 1-bit flag/indication is one, the UE may be configured to transmit a DMRS-only PUSCH.

Figure 9:
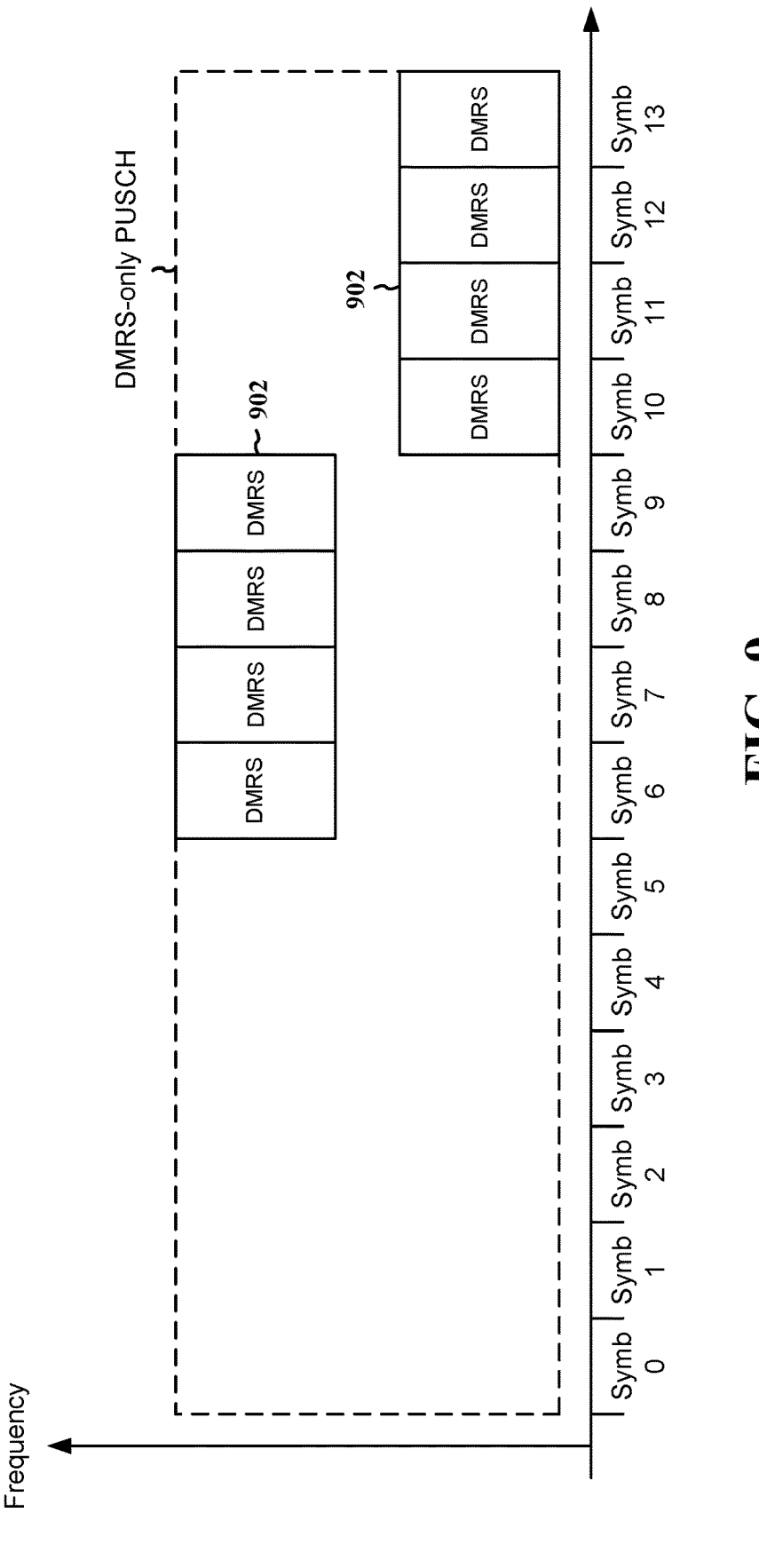
FIG. 9 is a diagram illustrating an example DMRS-only PUSCH for channel sounding in accordance with various aspects of the present disclosure.

FIG. 9 is a diagram 900 illustrating an example DMRS-only PUSCH for channel sounding in accordance with various aspects of the present disclosure. As shown at 902, for a DMRS-only PUSCH, a UE (e.g., the UE 502) may be configured to transmit the DMRS just in the allocated PUSCH resources. For example, the time domain resource allocations (TDRA) field in UL DCI may be used by a base station (e.g., the base station 504) to indicate, to the UE, the OFDM symbols for DMRS-only PUSCH transmission(s). In some examples, the DMRS may be repeated if the number of allocated OFDM symbols is larger than the DMRS symbol length. In addition, the frequency domain resource allocations (FDRA) field in the UL DCI may be used to indicate the PRBs for DMRS transmission. In another example, the UE may also apply frequency hopping to the transmission of DMRS if it is being indicated in the UL DCI. Frequency hopping may refer to transmitting a transmission using different bandwidths, such as shown at 902.

In another aspect of the present disclosure, the Tx power of a DMRS-only PUSCH may be determined based on a power control equation of PUSCH. For example, the Tx power of a DMRS-only PUSCH may be calculated using the bandwidth of PUSCH allocation and the MCS based on the equation shown by a diagram 1000 of FIG. 10.

$$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is a SCS configuration. In addition, $$\Delta_{TF,b,f,c}(i) = 10\log_{10}\left(\left(2^{BPRE \cdot K_s} - 1\right) \cdot \beta_{offset}^{PUSCH}\right) \text{ for } K_s = 1.25$$

and $\Delta_{TF,b,f,c}(i)=0$ for $K_S=0$ where $K_S$ is provided by delta-MCS for each UL BWP b of each carrier f and serving cell c. If the PUSCH transmission is over more than one layer, $\Delta_{TF,b,f,c}(i)=0$. BPRE and $$\beta_{offset}^{PUSCH},$$

for active UL BWP b of each carrier f and each serving cell c may also be computed based on a defined equation.

Figure 11:
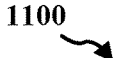
FIG. 11 is a diagram illustrating an example of modulation coding scheme (MCS) index table in accordance with various aspects of the present disclosure.

FIG. 11 is a diagram 1100 illustrating an example of MCS index table in accordance with various aspects of the present disclosure. In another aspect of the present disclosure, a base station (e.g., the base station 504) may indicate/configure a UE (e.g., the UE 502) to transmit a DMRS-only PUSCH using a reserved codepoint in an MCS table to indicate DMRS-only PUSCH. For example, as shown at 1102, one or more reserved bits/fields in the MCS table may be used to indicate the DMRS-only PUSCH, e.g., indicate {target code rate=0, spectral efficiency=0}, etc. In addition, the base station may configure, for the UE, the MCS index for transmit power determination by radio resource control (RRC) signaling. In another example, as an alternative or in addition to indicating the DMRS-only PUSCH using a reserved codepoint in an MCS table, a base station may indicate/configure a UE to transmit a DMRS-only PUSCH by a 1-bit flag in DCI, such as described in connection with FIGS. 8A and 8B. Similarly, the MCS index for transmit power determination may be derived from an MCS field in the DCI.

FIG. 12 is a flowchart 1200 of a method of wireless communication. The method may be performed by a UE (e.g., the UE 104, 402, 502; the apparatus 1404). The method may enable the UE to more likely perform and/or maintain coherent UL MIMO operation(s)/transmission(s), thereby improving the performance of wireless communication between the UE and a network entity (e.g., a base station).

At 1204, the UE may transmit, to a network entity, a set of PUSCH DMRS, such as described in connection with FIG. 5. For example, at 512, the UE 502 may transmit, to the base station 504, a PUSCH (e.g., an (N−1)th PUSCH) that includes a set of PUSCH DMRS via multiple antenna ports. The transmission of the set of PUSCH DMRS may be performed by, e.g., the coherent UL MIMO operation component 198, the transceiver(s) 1422, the cellular baseband processor(s) 1424, and/or the application processor(s) 1406 of the apparatus 1404 in FIG. 14.

In one example, to transmit the set of PUSCH DMRS, the UE may transmit the set of PUSCH DMRS via a PUSCH without data (which may be referred to as DMRS-only PUSCH). In some implementations, the UE may receive, from the network entity prior to the transmission of the set of PUSCH DMRS, an indication that the set of PUSCH DMRS are to be transmitted in the PUSCH without the data. In some implementations, to receive the indication, the UE may receive the indication based on a codepoint in an MCS table or via a flag in DCI. In some implementations, the UE may calculate a Tx power for the transmission of the set of PUSCH DMRS via the PUSCH without the data based on a bandwidth and an MCS associated with the PUSCH without the data. In some implementations, the UE may determine the MCS based on RRC signaling when the PUSCH without the data is indicated via a codepoint in an MCS table; or the UE may determine the MCS based on an MCS field in DCI when the PUSCH without the data is indicated via a flag in the DCI.

At 1206, the UE may receive, from the network entity via a PDCCH, a TPMI indicating a selected precoding, where the PDCCH schedules a subsequent PUSCH transmission for the UE, such as described in connection with FIG. 5. For example, at 518, the UE 502 may receive, from the base station 504, scheduling of a subsequent PUSCH transmission, where the scheduling may include a TPMI that indicates a precoding determined/selected by the base station 504. The reception of the TPMI may be performed by, e.g., the coherent UL MIMO operation component 198, the transceiver(s) 1422, the cellular baseband processor(s) 1424, and/or the application processor(s) 1406 of the apparatus 1404 in FIG. 14.

In one example, the TPMI may be included in scheduling DCI of the PDCCH, where to receive the TPMI indicating the selected precoding, the UE may receive, from the network entity via the scheduling DCI of the PDCCH, the TPMI to use for precoding of the subsequent PUSCH transmission.

At 1208, the UE may transmit, to the network entity, the subsequent PUSCH transmission based on the selected precoding indicated by the TPMI, such as described in connection with FIG. 5. For example, at 520, based on the UL scheduling with the TPMI, the UE 502 may transmit the subsequent PUSCH transmission using the precoding indicated by the TPMI in the scheduling DCI. The transmission of the subsequent PUSCH transmission may be performed by, e.g., the coherent UL MIMO operation component 198, the transceiver(s) 1422, the cellular baseband processor(s) 1424, and/or the application processor(s) 1406 of the apparatus 1404 in FIG. 14.

Figures 6A, 6B:
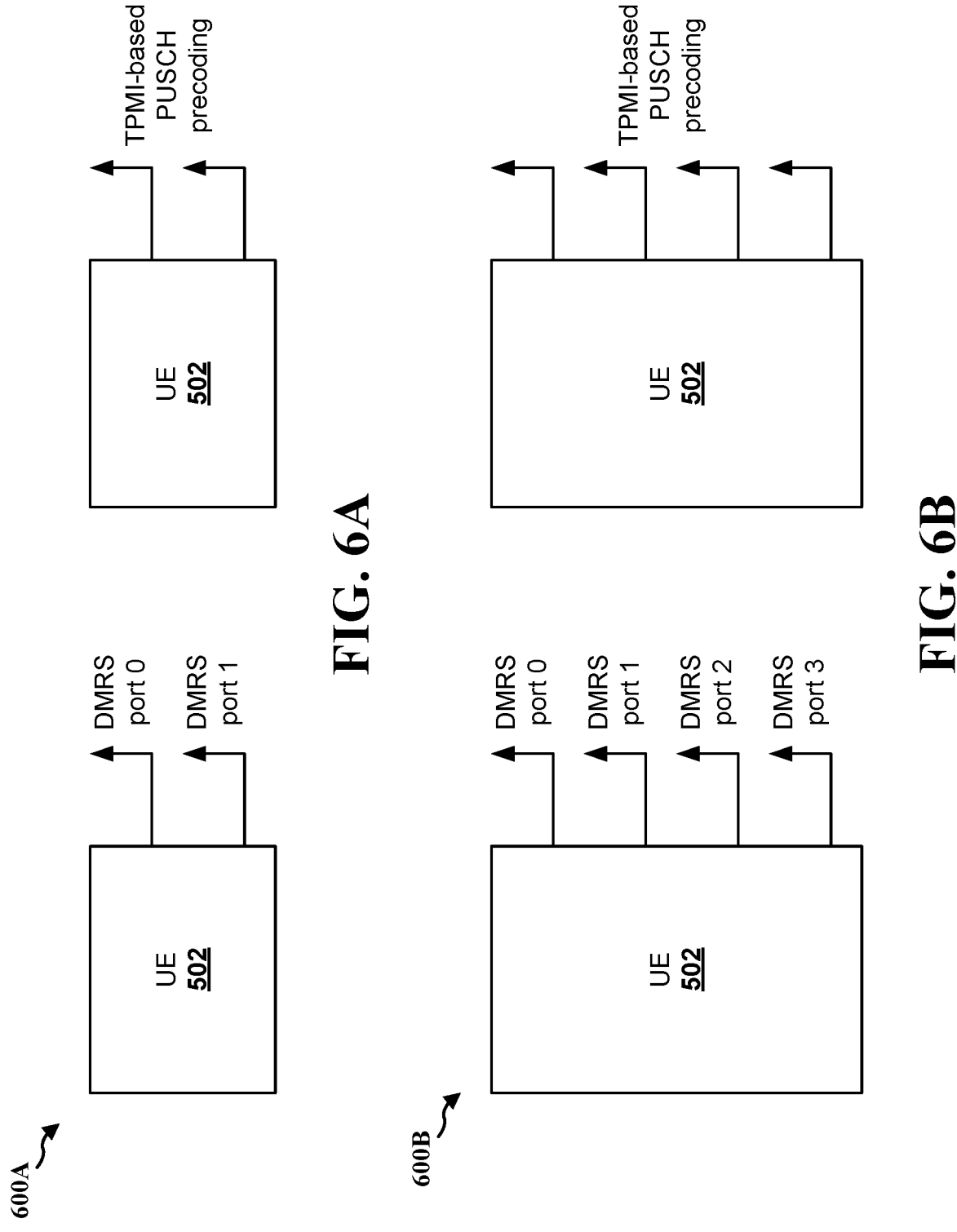
FIG. 6A is a diagram illustrating an example of non-transparent physical uplink shared channel (PUSCH) and DMRS transmission in accordance with aspects of the present disclosure.
FIG. 6B is a diagram illustrating an example of non-transparent PUSCH and DMRS transmission in accordance with aspects of the present disclosure.

In one example, the UE may indicate, to the network entity, a capability of the UE for a number of Tx ports, and receive, from the network entity, a configuration for a number of DMRS ports and one or more DMRS parameters for a transmission of the set of PUSCH DMRS based on the indicated capability, such as described in connection with FIGS. 5, 6A, and 6B. For example, for DMRS-based coherent UL MIMO, a UE (e.g., the UE 502) may be specified to transmit DMRS from all of its antenna ports. In other words, the PUSCH and DMRS transmission from the UE may be considered as non-transparent, where DMRS may be transmitted by the UE without precoding separately from each of its Tx port, and the network entity (e.g., the base station 504) may configure the number of DMRS ports and other DMRS parameters for the UE based on the UE's capability on number of Tx ports. In some examples, the UE may indicate its capability on number of Tx ports to the base station. The indication of the capability may be performed by, e.g., the coherent UL MIMO operation component 198, the transceiver(s) 1422, the cellular baseband processor(s) 1424, and/or the application processor(s) 1406 of the apparatus 1404 in FIG. 14. In some implementations, to transmit the set of PUSCH DMRS, the UE may transmit the set of PUSCH DMRS from each Tx port in the number of Tx ports of the UE without the precoding, such that the set of PUSCH DMRS is used in association with a channel sounding for a precoding determination and a channel estimation for a PUSCH demodulation.

In another example, the UE may maintain a power and phase coherency for PUSCH transmissions within an UL transmission window, where transmitting the subsequent PUSCH transmission is based on the maintained power and phase coherency, such as described in connection with FIGS. 5 and 7. For example, for DMRS-based coherent UL MIMO, a UE (e.g., the UE 502) may maintain phase and coherency across UL transmissions (which may also be referred to as UL bursts) when FDRA of PUSCH is maintained and the transmit power is not changed. The maintenance of the power and phase coherency may be performed by, e.g., the coherent UL MIMO operation component 198, the transceiver(s) 1422, the cellular baseband processor(s) 1424, and/or the application processor(s) 1406 of the apparatus 1404 in FIG. 14.

In another example, the UE may maintain a power and phase coherency for PUSCH transmissions across adjacent UL transmission windows except for a loop control update or an RF control update, where transmitting the subsequent PUSCH transmission is based on the maintained power and phase coherency, such as described in connection with FIG. 5. For example, the UE may also be specified to maintain power and phase coherency for PUSCH transmission(s) across adjacent UL transmission windows (except for the case with loop/RF control update). The maintenance of the power and phase coherency may be performed by, e.g., the coherent UL MIMO operation component 198, the transceiver(s) 1422, the cellular baseband processor(s) 1424, and/or the application processor(s) 1406 of the apparatus 1404 in FIG. 14. In some implementations, the UE may break the power and phase coherency for the PUSCH transmissions based on the loop control update or the RF control update within a pre-defined allowance, where the transmission of the subsequent PUSCH transmission is based on the broken power and phase coherency. In some implementations, the UE may receive, from the network entity, a configuration of an SFN and a slot number with a periodicity for breaking the power and phase coherency for the PUSCH transmissions, and apply the loop control update or the RF control update based on the configuration.

FIG. 13 is a flowchart 1300 of a method of wireless communication. The method may be performed by a UE (e.g., the UE 104, 402, 502; the apparatus 1404). The method may enable the UE to more likely perform and/or maintain coherent UL MIMO operation(s)/transmission(s), thereby improving the performance of wireless communication between the UE and a network entity (e.g., a base station).

At 1304, the UE may transmit, to a network entity, a set of PUSCH DMRS, such as described in connection with FIG. 5. For example, at 512, the UE 502 may transmit, to the base station 504, a PUSCH (e.g., an (N−1)th PUSCH) that includes a set of PUSCH DMRS via multiple antenna ports. The transmission of the set of PUSCH DMRS may be performed by, e.g., the coherent UL MIMO operation component 198, the transceiver(s) 1422, the cellular baseband processor(s) 1424, and/or the application processor(s) 1406 of the apparatus 1404 in FIG. 14.

In one example, to transmit the set of PUSCH DMRS, the UE may transmit the set of PUSCH DMRS via a PUSCH without data (which may be referred to as DMRS-only PUSCH). In some implementations, the UE may receive, from the network entity prior to the transmission of the set of PUSCH DMRS, an indication that the set of PUSCH DMRS are to be transmitted in the PUSCH without the data. In some implementations, to receive the indication, the UE may receive the indication based on a codepoint in an MCS table or via a flag in DCI. In some implementations, the UE may calculate a Tx power for the transmission of the set of PUSCH DMRS via the PUSCH without the data based on a bandwidth and an MCS associated with the PUSCH without the data. In some implementations, the UE may determine the MCS based on RRC signaling when the PUSCH without the data is indicated via a codepoint in an MCS table; or the UE may determine the MCS based on an MCS field in DCI when the PUSCH without the data is indicated via a flag in the DCI.

At 1306, the UE may receive, from the network entity via a PDCCH, a TPMI indicating a selected precoding, where the PDCCH schedules a subsequent PUSCH transmission for the UE, such as described in connection with FIG. 5. For example, at 518, the UE 502 may receive, from the base station 504, scheduling of a subsequent PUSCH transmission, where the scheduling may include a TPMI that indicates a precoding determined/selected by the base station 504. The reception of the TPMI may be performed by, e.g., the coherent UL MIMO operation component 198, the transceiver(s) 1422, the cellular baseband processor(s) 1424, and/or the application processor(s) 1406 of the apparatus 1404 in FIG. 14.

In one example, the TPMI may be included in scheduling DCI of the PDCCH, where to receive the TPMI indicating the selected precoding, the UE may receive, from the network entity via the scheduling DCI of the PDCCH, the TPMI to use for precoding of the subsequent PUSCH transmission.

At 1308, the UE may transmit, to the network entity, the subsequent PUSCH transmission based on the selected precoding indicated by the TPMI, such as described in connection with FIG. 5. For example, at 520, based on the UL scheduling with the TPMI, the UE 502 may transmit the subsequent PUSCH transmission using the precoding indicated by the TPMI in the scheduling DCI. The transmission of the subsequent PUSCH transmission may be performed by, e.g., the coherent UL MIMO operation component 198, the transceiver(s) 1422, the cellular baseband processor(s) 1424, and/or the application processor(s) 1406 of the apparatus 1404 in FIG. 14.

In one example, at 1302, the UE may indicate, to the network entity, a capability of the UE for a number of Tx ports, and receive, from the network entity, a configuration for a number of DMRS ports and one or more DMRS parameters for a transmission of the set of PUSCH DMRS based on the indicated capability, such as described in connection with FIGS. 5, 6A, and 6B. For example, for DMRS-based coherent UL MIMO, a UE (e.g., the UE 502) may be specified to transmit DMRS from all of its antenna ports. In other words, the PUSCH and DMRS transmission from the UE may be considered as non-transparent, where DMRS may be transmitted by the UE without precoding separately from each of its Tx port while PUSCH may be transmitted by the UE with precoding indicated by the TPMI in the scheduling DCI, and the network entity (e.g., the base station 504) may configure the number of DMRS ports and other DMRS parameters for the UE based on the UE's capability on number of Tx ports. In some examples, the UE may indicate its capability on number of Tx ports to the base station. The indication of the capability may be performed by, e.g., the coherent UL MIMO operation component 198, the transceiver(s) 1422, the cellular baseband processor(s) 1424, and/or the application processor(s) 1406 of the apparatus 1404 in FIG. 14. In some implementations, to transmit the set of PUSCH DMRS, the UE may transmit the set of PUSCH DMRS from each Tx port in the number of Tx ports of the UE without the precoding, such that the set of PUSCH DMRS is used in association with a channel sounding for a precoding determination and a channel estimation for a PUSCH demodulation.

In another example, at 1310, the UE may maintain a power and phase coherency for PUSCH transmissions within an UL transmission window, where transmitting the subsequent PUSCH transmission is based on the maintained power and phase coherency, such as described in connection with FIGS. 5 and 7. For example, for DMRS-based coherent UL MIMO, a UE (e.g., the UE 502) may maintain phase and coherency across UL transmissions (which may also be referred to as UL bursts) when FDRA of PUSCH is maintained and the transmit power is not changed. The maintenance of the power and phase coherency may be performed by, e.g., the coherent UL MIMO operation component 198, the transceiver(s) 1422, the cellular baseband processor(s) 1424, and/or the application processor(s) 1406 of the apparatus 1404 in FIG. 14.

In another example, at 1312, the UE may maintain a power and phase coherency for PUSCH transmissions across adjacent UL transmission windows except for a loop control update or an RF control update, where transmitting the subsequent PUSCH transmission is based on the maintained power and phase coherency, such as described in connection with FIG. 5. For example, the UE may also be specified to maintain power and phase coherency for PUSCH transmission(s) across adjacent UL transmission windows (except for the case with loop/RF control update). The maintenance of the power and phase coherency may be performed by, e.g., the coherent UL MIMO operation component 198, the transceiver(s) 1422, the cellular baseband processor(s) 1424, and/or the application processor(s) 1406 of the apparatus 1404 in FIG. 14. In some implementations, the UE may break the power and phase coherency for the PUSCH transmissions based on the loop control update or the RF control update within a pre-defined allowance, where the transmission of the subsequent PUSCH transmission is based on the broken power and phase coherency. In some implementations, the UE may receive, from the network entity, a configuration of an SFN and a slot number with a periodicity for breaking the power and phase coherency for the PUSCH transmissions, and apply the loop control update or the RF control update based on the configuration.

Figure 14:
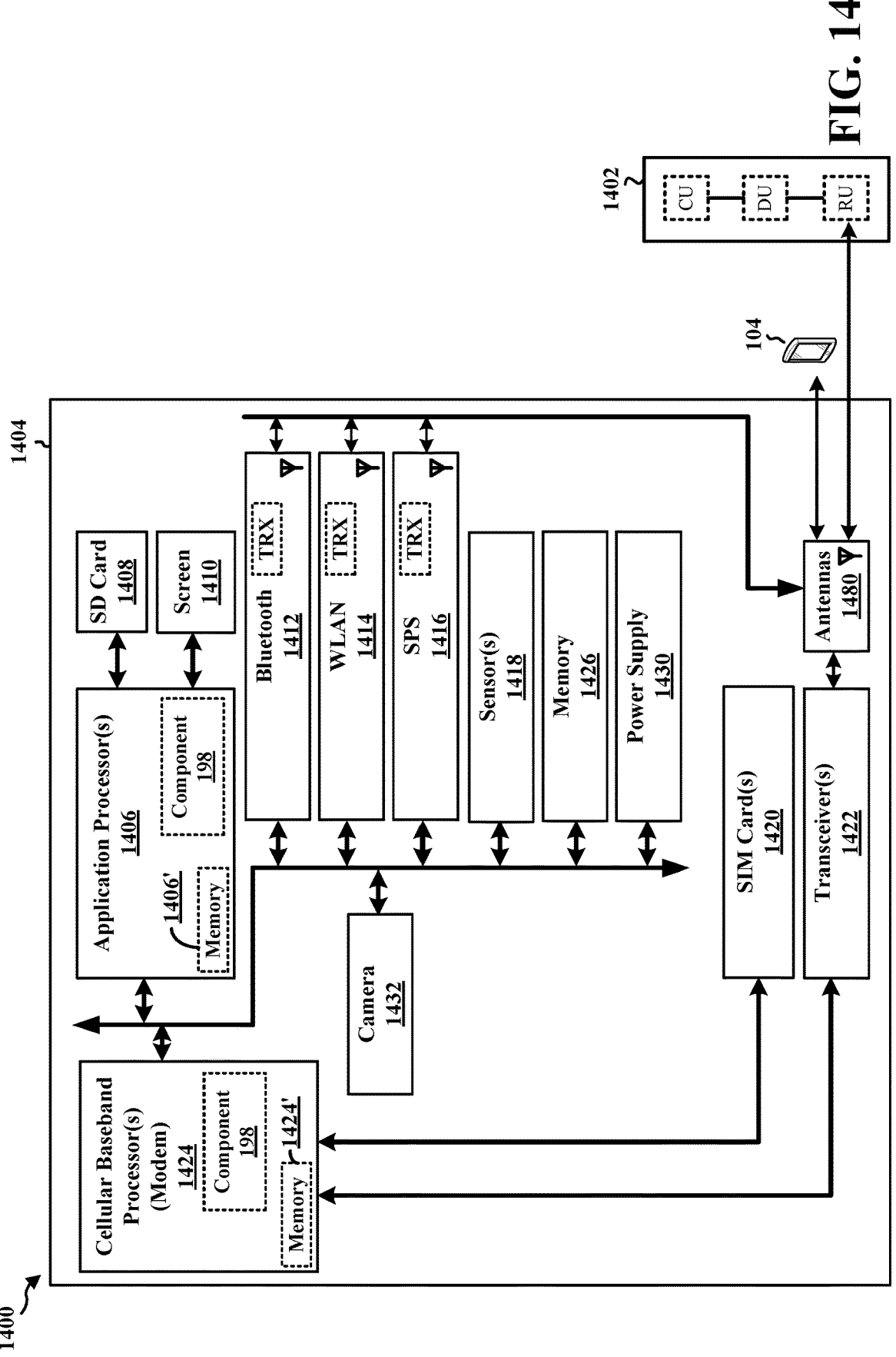
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; ultrawide band (UWB) sensor, motion sensor such as inertial measurement unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The computer-readable medium/memory may also be used for storing data that is manipulated by the cellular baseband processor(s) 1424/application processor (s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the coherent UL MIMO operation component 198 may be configured to transmit, to a network entity, a set of PUSCH DMRS. The coherent UL MIMO operation component 198 may also be configured to receive, from the network entity via a PDCCH, a TPMI indicating a selected precoding, where the PDCCH schedules a subsequent PUSCH transmission for the UE. The coherent UL MIMO operation component 198 may also be configured to transmit, to the network entity, the subsequent PUSCH transmission based on the selected precoding indicated by the TPMI. The coherent UL MIMO operation component 198 may be within the cellular baseband processor(s) 1424, the application processor(s) 1406, or both the cellular baseband processor(s) 1424 and the application processor(s) 1406. The coherent UL MIMO operation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for transmitting, to a network entity, a set of PUSCH DMRS. The apparatus 1404 may further include means for receiving, from the network entity via a PDCCH, a TPMI indicating a selected precoding, where the PDCCH schedules a subsequent PUSCH transmission for the UE. The apparatus 1404 may further include means for transmitting, to the network entity, the subsequent PUSCH transmission based on the selected precoding indicated by the TPMI.

In one configuration, the means for transmitting the set of PUSCH DMRS may include configuring the apparatus 1404 to transmit the set of PUSCH DMRS via a PUSCH without data. In some implementations, the apparatus 1404 may further include means for receiving, from the network entity prior to the transmission of the set of PUSCH DMRS, an indication that the set of PUSCH DMRS are to be transmitted in the PUSCH without the data. In some implementations, the means for receiving the indication may include configuring the apparatus 1404 to receive the indication based on a codepoint in an MCS table or via a flag in DCI. In some implementations, the apparatus 1404 may further include means for calculating a Tx power for the transmission of the set of PUSCH DMRS via the PUSCH without the data based on a bandwidth and an MCS associated with the PUSCH without the data. In some implementations, the apparatus 1404 may further include means for determining the MCS based on RRC signaling when the PUSCH without the data is indicated via a codepoint in an MCS table; or means for determining the MCS based on an MCS field in DCI when the PUSCH without the data is indicated via a flag in the DCI.

In one configuration, the TPMI may be included in scheduling DCI of the PDCCH, where the means for receiving the TPMI indicating the selected precoding may include configuring the apparatus 1404 to receive, from the network entity via the scheduling DCI of the PDCCH, the TPMI to use for precoding of the subsequent PUSCH transmission.

In another configuration, the apparatus 1404 may further include means for indicating, to the network entity, a capability of the UE for a number of Tx ports, and means for receiving, from the network entity, a configuration for a number of DMRS ports and one or more DMRS parameters for a transmission of the set of PUSCH DMRS based on the indicated capability. In some implementations, the means for transmitting the set of PUSCH DMRS may include configuring the apparatus 1404 to transmit the set of PUSCH DMRS from each Tx port in the number of Tx ports of the apparatus 1404 without precoding, such that the set of PUSCH DMRS is used in association with a channel sounding for a precoding determination and a channel estimation for a PUSCH demodulation.

In another configuration, the apparatus 1404 may further include means for maintaining a power and phase coherency for PUSCH transmissions within an UL transmission window, where the transmission of the subsequent PUSCH transmission is based on the maintained power and phase coherency.

In another configuration, the apparatus 1404 may further include means for maintaining a power and phase coherency for PUSCH transmissions across adjacent UL transmission windows except for a loop control update or an RF control update, where the transmission of the subsequent PUSCH transmission is based on the maintained power and phase coherency. In some implementations, the apparatus 1404 may further include means for breaking the power and phase coherency for the PUSCH transmissions based on the loop control update or the RF control update within a pre-defined allowance, where the transmission of the subsequent PUSCH transmission is based on the broken power and phase coherency. In some implementations, the apparatus 1404 may further include means for receiving, from the network entity, a configuration of an SFN and a slot number with a periodicity for breaking the power and phase coherency for the PUSCH transmissions, and means for applying the loop control update or the RF control update based on the configuration.

The means may be the coherent UL MIMO operation component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 15 is a flowchart 1500 of a method of wireless communication. The method may be performed by a base station (e.g., the base station 102, 404, 504; the network entity 1402, 1702). The method may enable the base station to perform channel sounding for a channel between the base station and a UE more frequently without increasing communication overhead significantly or at all, thereby enabling the base station to configure a more suitable precoding for UL transmission(s) of the UE.

At 1510, the base station may perform channel sounding for a channel based on a set of PUSCH DMRS received from a UE via the channel, such as described in connection with FIG. 5. For example, at 514, the base station 504 may measure the set of PUSCH DMRS transmitted from the UE 502 and perform the DMRS-based channel sounding for the channel. The channel sounding may be performed by, e.g., the DMRS-based channel sounding component 199, the RU processor(s) 1742, and/or the transceiver(s) 1746 of the network entity 1702 in FIG. 17.

At 1512, the base station may select a precoding to be used by the UE for a subsequent PUSCH transmission via the channel based on the channel sounding, such as described in connection with FIG. 5. For example, at 516, the base station 504 may determine/select a precoding to be used by the UE 502 (or suitable for the UE 502) for a subsequent PUSCH transmission (e.g., an Nth PUSCH) via the channel based on the measurements for the set of DMRS. The selection of the precoding may be performed by, e.g., the DMRS-based channel sounding component 199, the RU processor(s) 1742, and/or the transceiver(s) 1746 of the network entity 1702 in FIG. 17.

At 1514, the base station may transmit, for the UE via a PDCCH, a TPMI indicating the selected precoding, where the PDCCH schedules the subsequent PUSCH transmission for the UE, such as described in connection with FIG. 5. For example, at 518, after the base station 504 determines/selects the precoding, the base station 504 may schedule the subsequent PUSCH transmission for the UE 502, where the UL scheduling may include a TPMI that indicates the precoding determined/selected by the base station 504. The transmission of the TPMI may be performed by, e.g., the DMRS-based channel sounding component 199, the RU processor(s) 1742, and/or the transceiver(s) 1746 of the network entity 1702 in FIG. 17. For purposes of the present disclosure, when a first entity transmits a transmission (e.g., an indication, a configuration, a request, a data, etc.) "for" a second entity, it may indicate that the first entity is transmitting the transmission directly to the second entity, and/or that that the first entity is transmitting the transmission to the second entity via at least one other entity (e.g., a third entity) or component. For example, when a base station transmits a configuration for a UE, it may refer that the base station is transmitting the configuration directly to the UE, or indirectly to the UE via another network node or component.

In one example, the base station may perform a channel estimation for a PUSCH demodulation based on non-precoded DMRS and the TPMI.

In another example, the TPMI may be included in scheduling DCI of the PDCCH, where the base station may transmit, for the UE via the scheduling DCI of the PDCCH, the TPMI indicating the selected precoding.

In another example, the TPMI is a coherent TPMI, and the scheduling of the subsequent PUSCH transmission with the coherent TPMI is based on at least one of: a FDRA of a PUSCH being identical between a reference PUSCH transmission and the subsequent PUSCH transmission in terms of a number of PRBs and a PRB location in a BWP; an MCS not being changed between the reference PUSCH transmission and the subsequent PUSCH transmission; or a lack of a closed-loop power control command between the reference PUSCH transmission and the subsequent PUSCH transmission.

In another example, the base station may configure, for the UE, a number of DMRS ports and one or more DMRS parameters for a transmission of the set of PUSCH DMRS based on a capability of the UE for a number of Tx ports, such as described in connection with FIG. 5. For example, for DMRS-based coherent UL MIMO, a UE (e.g., the UE 502) may be specified to transmit DMRS from all of its antenna ports. In other words, the PUSCH and DMRS transmission from the UE may be considered as non-transparent, where DMRS may be transmitted by the UE without precoding separately from each of its Tx port, and the network entity (e.g., the base station 504) may configure the number of DMRS ports and other DMRS parameters for the UE based on the UE's capability on number of Tx ports.

In some examples, the UE may indicate its capability on number of Tx ports to the base station. The configuration of the number of DMRS ports may be performed by, e.g., the DMRS-based channel sounding component 199, the RU processor(s) 1742, and/or the transceiver(s) 1746 of the network entity 1702 in FIG. 17. In some implementations, the base station may receive the set of PUSCH DMRS from each Tx port in the number of Tx ports of the UE without the precoding, such that the set of PUSCH DMRS is used for the channel sounding and a channel estimation for a PUSCH demodulation.

In another example, the base station may configure, for the UE, a PUSCH with non-coherent TPMI based on a lack of a reference PUSCH transmission from the UE or with coherent TPMI based on a presence of the reference PUSCH transmission from the UE, such as described in connection with FIG. 5. For example, as shown at 512, in some scenarios the base station 504 may not be able to select/determine a precoding for a first PUSCH transmission (e.g., the (N−1)th PUSCH) from the UE 502 as the base station 504 may not have an opportunity to perform a DMRS-based channel sounding for the first PUSCH transmission. In other words, the first PUSCH transmission may be without a reference PUSCH transmission. As such, when there is no reference PUSCH transmission (e.g., without a previous PUSCH transmission that carries PUSCH DMRS), the base station 504 may configure the first PUSCH for the UE 502 with a non-coherent TPMI. The configuration of the PUSCH with non-coherent TPMI may be performed by, e.g., the DMRS-based channel sounding component 199, the RU processor(s) 1742, and/or the transceiver(s) 1746 of the network entity 1702 in FIG. 17. In some implementations, the reference PUSCH transmission from the UE may correspond to a PUSCH transmission from the UE in a previous UL transmission window.

In another example, the base station may configure, for the UE, at least one UL transmission window for coherent UL MIMO based on a maximum duration of a UL transmission window supported by the UE for the coherent UL MIMO, such as described in connection with FIGS. 5 and 7. For example, the base station may be specified not to configure an UL transmission window for coherent UL MIMO that is larger than the UE capability for maximum UL transmission window for coherent UL MIMO. For example, as shown at 706, if the UE is just capable of maintain power and phase coherency for two UL transmissions/bursts or may support a maximum duration of a UL transmission window after a channel sounding as shown at 704, then the base station may not configure an UL transmission window for coherent UL MIMO that exceeds the capability of the UE or the maximum duration supported by the UE. The configuration of the at least one UL transmission window may be performed by, e.g., the DMRS-based channel sounding component 199, the RU processor(s) 1742, and/or the transceiver(s) 1746 of the network entity 1702 in FIG. 17.

In another example, the base station may receive, from the UE, the set of PUSCH DMRS in a previous UL transmission window, where performing the channel sounding for the channel is based on the reception of the set of PUSCH DMRS in the previous UL transmission window, such as described in connection with FIG. 5. For example, at 512, the base station 504 may receive, from the UE, the set of PUSCH DMRS in a previous UL transmission window, and perform the channel sounding for the channel. The reception of the set of PUSCH DMRS may be performed by, e.g., the DMRS-based channel sounding component 199, the RU processor(s) 1742, and/or the transceiver(s) 1746 of the network entity 1702 in FIG. 17.

In another example, the base station may receive, from the UE, the set of PUSCH DMRS in a PUSCH without data, where performing the channel sounding for the channel is based on the reception of the set of PUSCH DMRS in the PUSCH without the data. In some implementations, the base station may transmit, to the UE prior to the reception of the set of PUSCH DMRS, an indication that the set of PUSCH DMRS are to be transmitted in the PUSCH without the data. In some implementations, to transmit the indication, the base station may transmit the indication based on a codepoint in an MCS table or via a flag in DCI.

In another example, the base station may receive, from the UE based on the PDCCH, the subsequent PUSCH transmission with the precoding according to the TPMI, such as described in connection with FIG. 5. For example, at 520, based on the UL scheduling with the TPMI, the base station 504 may receive, from the UE 502, a PUSCH transmission using the precoding indicated by the TPMI in the scheduling DCI. The reception of the subsequent PUSCH transmission may be performed by, e.g., the DMRS-based channel sounding component 199, the RU processor(s) 1742, and/or the transceiver(s) 1746 of the network entity 1702 in FIG. 17.

FIG. 16 is a flowchart 1600 of a method of wireless communication. The method may be performed by a base station (e.g., the base station 102, 404, 504; the network entity 1402, 1702). The method may enable the base station to perform channel sounding for a channel between the base station and a UE more frequently without increasing communication overhead significantly or at all, thereby enabling the base station to configure a more suitable precoding for UL transmission(s) of the UE.

At 1610, the base station may perform channel sounding for a channel based on a set of PUSCH DMRS received from a UE via the channel, such as described in connection with FIG. 5. For example, at 514, the base station 504 may measure the set of PUSCH DMRS transmitted from the UE 502 and perform the DMRS-based channel sounding for the channel. The channel sounding may be performed by, e.g., the DMRS-based channel sounding component 199, the RU processor(s) 1742, and/or the transceiver(s) 1746 of the network entity 1702 in FIG. 17.

At 1612, the base station may select a precoding to be used by the UE for a subsequent PUSCH transmission via the channel based on the channel sounding, such as described in connection with FIG. 5. For example, at 516, the base station 504 may determine/select a precoding to be used by the UE 502 (or suitable for the UE 502) for a subsequent PUSCH transmission (e.g., an Nth PUSCH) via the channel based on the measurements for the set of DMRS. The selection of the precoding may be performed by, e.g., the DMRS-based channel sounding component 199, the RU processor(s) 1742, and/or the transceiver(s) 1746 of the network entity 1702 in FIG. 17.

At 1614, the base station may transmit, for the UE via a PDCCH, a TPMI indicating the selected precoding, where the PDCCH schedules the subsequent PUSCH transmission for the UE, such as described in connection with FIG. 5. For example, at 518, after the base station 504 determines/selects the precoding, the base station 504 may schedule the subsequent PUSCH transmission for the UE 502, where the UL scheduling may include a TPMI that indicates the precoding determined/selected by the base station 504. The transmission of the TPMI may be performed by, e.g., the DMRS-based channel sounding component 199, the RU processor(s) 1742, and/or the transceiver(s) 1746 of the network entity 1702 in FIG. 17. For purposes of the present disclosure, when a first entity transmits a transmission (e.g., an indication, a configuration, a request, a data, etc.) "for" a second entity, it may indicate that the first entity is transmitting the transmission directly to the second entity, and/or that that the first entity is transmitting the transmission to the second entity via at least one other entity (e.g., a third entity) or component. For example, when a base station transmits a configuration for a UE, it may refer that the base station is transmitting the configuration directly to the UE, or indirectly to the UE via another network node or component.

In one example, the base station may perform a channel estimation for a PUSCH demodulation based on non-precoded DMRS and the TPMI.

In another example, the TPMI may be included in scheduling DCI of the PDCCH, where the base station may transmit, for the UE via the scheduling DCI of the PDCCH, the TPMI indicating the selected precoding.

In another example, the TPMI is a coherent TPMI, and the scheduling of the subsequent PUSCH transmission with the coherent TPMI is based on at least one of: a FDRA of a PUSCH being identical between a reference PUSCH transmission and the subsequent PUSCH transmission in terms of a number of PRBs and a PRB location in a BWP; an MCS not being changed between the reference PUSCH transmission and the subsequent PUSCH transmission; or a lack of a closed-loop power control command between the reference PUSCH transmission and the subsequent PUSCH transmission.

In another example, at 1602, the base station may configure, for the UE, a number of DMRS ports and one or more DMRS parameters for a transmission of the set of PUSCH DMRS based on a capability of the UE for a number of Tx ports, such as described in connection with FIG. 5. For example, for DMRS-based coherent UL MIMO, a UE (e.g., the UE 502) may be specified to transmit DMRS from all of its antenna ports. In other words, the PUSCH and DMRS transmission from the UE may be considered as non-transparent, where DMRS may be transmitted by the UE without precoding separately from each of its Tx port, and the network entity (e.g., the base station 504) may configure the number of DMRS ports and other DMRS parameters for the UE based on the UE's capability on number of Tx ports. In some examples, the UE may indicate its capability on number of Tx ports to the base station. The configuration of the number of DMRS ports may be performed by, e.g., the DMRS-based channel sounding component 199, the RU processor(s) 1742, and/or the transceiver(s) 1746 of the network entity 1702 in FIG. 17. In some implementations, the base station may receive the set of PUSCH DMRS from each Tx port in the number of Tx ports of the UE without the precoding, such that the set of PUSCH DMRS is used for the channel sounding and a channel estimation for a PUSCH demodulation.

In another example, at 1604, the base station may configure, for the UE, a PUSCH with non-coherent TPMI based on a lack of a reference PUSCH transmission from the UE or with coherent TPMI based on a presence of the reference PUSCH transmission from the UE, such as described in connection with FIG. 5. For example, as shown at 512, in some scenarios the base station 504 may not be able to select/determine a precoding for a first PUSCH transmission (e.g., the (N−1)th PUSCH) from the UE 502 as the base station 504 may not have an opportunity to perform a DMRS-based channel sounding for the first PUSCH transmission. In other words, the first PUSCH transmission may be without a reference PUSCH transmission. As such, when there is no reference PUSCH transmission (e.g., without a previous PUSCH transmission that carries PUSCH DMRS), the base station 504 may configure the first PUSCH for the UE 502 with a non-coherent TPMI. The configuration of the PUSCH with non-coherent TPMI may be performed by, e.g., the DMRS-based channel sounding component 199, the RU processor(s) 1742, and/or the transceiver(s) 1746 of the network entity 1702 in FIG. 17. In some implementations, the reference PUSCH transmission from the UE may correspond to a PUSCH transmission from the UE in a previous UL transmission window.

In another example, at 1606, the base station may configure, for the UE, at least one UL transmission window for coherent UL MIMO based on a maximum duration of a UL transmission window supported by the UE for the coherent UL MIMO, such as described in connection with FIGS. 5 and 7. For example, the base station may be specified not to configure an UL transmission window for coherent UL MIMO that is larger than the UE capability for maximum UL transmission window for coherent UL MIMO. For example, as shown at 706, if the UE is just capable of maintain power and phase coherency for two UL transmissions/bursts or may support a maximum duration of a UL transmission window after a channel sounding as shown at 704, then the base station may not configure an UL transmission window for coherent UL MIMO that exceeds the capability of the UE or the maximum duration supported by the UE. The configuration of the at least one UL transmission window may be performed by, e.g., the DMRS-based channel sounding component 199, the RU processor(s) 1742, and/or the transceiver(s) 1746 of the network entity 1702 in FIG. 17.

In another example, at 1608, the base station may receive, from the UE, the set of PUSCH DMRS in a previous UL transmission window, where performing the channel sounding for the channel is based on the reception of the set of PUSCH DMRS in the previous UL transmission window, such as described in connection with FIG. 5. For example, at 512, the base station 504 may receive, from the UE, the set of PUSCH DMRS in a previous UL transmission window, and perform the channel sounding for the channel. The reception of the set of PUSCH DMRS may be performed by, e.g., the DMRS-based channel sounding component 199, the RU processor(s) 1742, and/or the transceiver(s) 1746 of the network entity 1702 in FIG. 17.

In another example, the base station may receive, from the UE, the set of PUSCH DMRS in a PUSCH without data, where performing the channel sounding for the channel is based on the reception of the set of PUSCH DMRS in the PUSCH without the data. In some implementations, the base station may transmit, to the UE prior to the reception of the set of PUSCH DMRS, an indication that the set of PUSCH DMRS are to be transmitted in the PUSCH without the data. In some implementations, to transmit the indication, the base station may transmit the indication based on a codepoint in an MCS table or via a flag in DCI.

In another example, at 1616, the base station may receive, from the UE based on the PDCCH, the subsequent PUSCH transmission with the precoding according to the TPMI, such as described in connection with FIG. 5. For example, at 520, based on the UL scheduling with the TPMI, the base station 504 may receive, from the UE 502, a PUSCH transmission using the precoding indicated by the TPMI in the scheduling DCI. The reception of the subsequent PUSCH transmission may be performed by, e.g., the DMRS-based channel sounding component 199, the RU processor(s) 1742, and/or the transceiver(s) 1746 of the network entity 1702 in FIG. 17.

Figure 17:
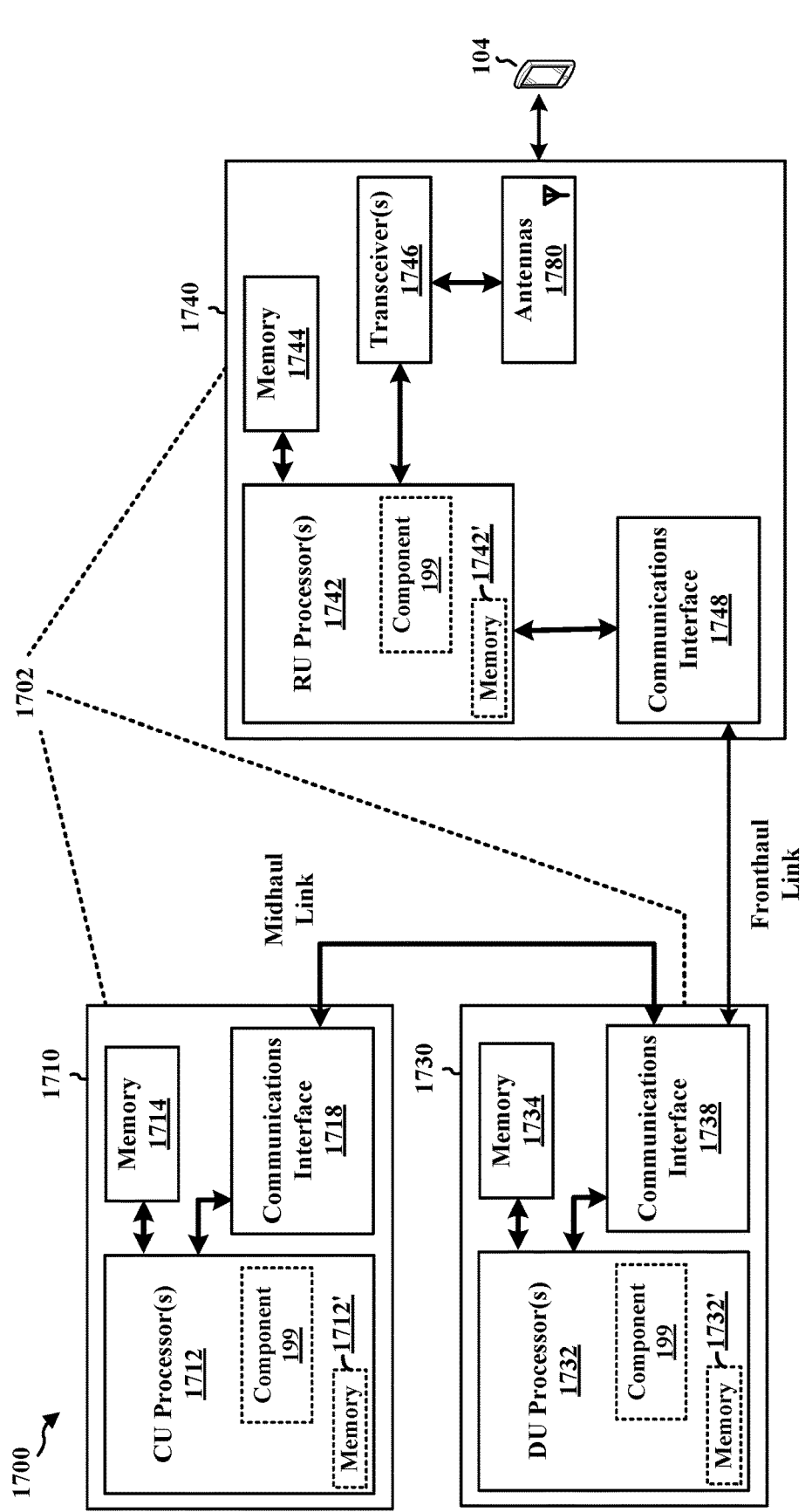
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the DMRS-based channel sounding component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include at least one CU processor 1712. The CU processor(s) 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include at least one DU processor 1732. The DU processor(s) 1732 may include on-chip memory 1732'. In some aspects, the DU 1730 may further include additional memory modules 1734 and a communications interface 1738. The DU 1730 communicates with the RU 1740 through a fronthaul link. The RU 1740 may include at least one RU processor 1742. The RU processor(s) 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the DMRS-based channel sounding component 199 may be configured to perform channel sounding for a channel based on a set of PUSCH DMRS received from a UE via the channel. The DMRS-based channel sounding component 199 may also be configured to select a precoding to be used by the UE for a subsequent PUSCH transmission via the channel based on the channel sounding. The DMRS-based channel sounding component 199 may also be configured to transmit, for the UE via a PDCCH, a TPMI indicating the selected precoding, where the PDCCH schedules the subsequent PUSCH transmission for the UE. The DMRS-based channel sounding component 199 may be within one or more processors of one or more of the CU 1710, DU 1730, and the RU 1740. The DMRS-based channel sounding component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1702 may include a variety of components configured for various functions. In one configuration, the network entity 1702 may include means for performing channel sounding for a channel based on a set of PUSCH DMRS received from a UE via the channel. The network entity 1702 may further include means for selecting a precoding to be used by the UE for a subsequent PUSCH transmission via the channel based on the channel sounding. The network entity 1702 may further include means for transmitting, for the UE via a PDCCH, a TPMI indicating the selected precoding, where the PDCCH schedules the subsequent PUSCH transmission for the UE.

In one configuration, the network entity 1702 may further include means for performing a channel estimation for a PUSCH demodulation based on non-precoded DMRS and the TPMI.

In another configuration, the TPMI may be included in scheduling DCI of the PDCCH, where the network entity 1702 may further include means for transmitting, for the UE via the scheduling DCI of the PDCCH, the TPMI indicating the selected precoding.

In another configuration, the TPMI is a coherent TPMI, and the scheduling of the subsequent PUSCH transmission with the coherent TPMI is based on at least one of: a FDRA of a PUSCH being identical between a reference PUSCH transmission and the subsequent PUSCH transmission in terms of a number of PRBs and a PRB location in a BWP; an MCS not being changed between the reference PUSCH transmission and the subsequent PUSCH transmission; or a lack of a closed-loop power control command between the reference PUSCH transmission and the subsequent PUSCH transmission.

In another configuration, the network entity 1702 may further include means for configuring, for the UE, a number of DMRS ports and one or more DMRS parameters for a transmission of the set of PUSCH DMRS based on a capability of the UE for a number of Tx ports. In some implementations, the network entity 1702 may further include means for receiving the set of PUSCH DMRS from each Tx port in the number of Tx ports of the UE without the precoding, such that the set of PUSCH DMRS is used for the channel sounding and a channel estimation for a PUSCH demodulation.

In another configuration, the network entity 1702 may further include means for configuring, for the UE, a PUSCH with non-coherent TPMI based on a lack of a reference PUSCH transmission from the UE or with coherent TPMI based on a presence of the reference PUSCH transmission from the UE. In some implementations, the reference PUSCH transmission from the UE may correspond to a PUSCH transmission from the UE in a previous UL transmission window.

In another configuration, the network entity 1702 may further include means for configuring, for the UE, at least one UL transmission window for coherent UL MIMO based on a maximum duration of a UL transmission window supported by the UE for the coherent UL MIMO.

In another configuration, the network entity 1702 may further include means for receiving, from the UE, the set of PUSCH DMRS in a previous UL transmission window, where performing the channel sounding for the channel is based on the reception of the set of PUSCH DMRS in the previous UL transmission window.

In another configuration, the network entity 1702 may further include means for receiving, from the UE, the set of PUSCH DMRS in a PUSCH without data, where performing the channel sounding for the channel is based on the reception of the set of PUSCH DMRS in the PUSCH without the data. In some implementations, the network entity 1702 may further include means for transmitting, to the UE prior to the reception of the set of PUSCH DMRS, an indication that the set of PUSCH DMRS are to be transmitted in the PUSCH without the data. In some implementations, to the means for transmitting the indication may include configuring the network entity 1702 to transmit the indication based on a codepoint in an MCS table or via a flag in DCI.

In another configuration, the network entity 1702 may further include means for receiving, from the UE based on the PDCCH, the subsequent PUSCH transmission with the precoding according to the TPMI.

The means may be the DMRS-based channel sounding component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising: performing channel sounding for a channel based on a set of physical uplink shared channel (PUSCH) demodulation reference signals (DMRS) received from a user equipment (UE) via the channel; selecting a precoding to be used by the UE for a subsequent PUSCH transmission via the channel based on the channel sounding; and transmitting, for the UE via a physical downlink control channel (PDCCH), a transmit precoder matrix indicator (TPMI) indicating the selected precoding, wherein the PDCCH schedules the subsequent PUSCH transmission for the UE.

Aspect 2 is the method of aspect 1, further comprising: receiving, from the UE based on the PDCCH, the subsequent PUSCH transmission with the precoding according to the TPMI.

Aspect 3 is the method of aspect 1 or aspect 2, further comprising: performing a channel estimation for a PUSCH demodulation based on non-precoded DMRS and the TPMI.

Aspect 4 is the method of any of aspects 1 to 3, wherein the TPMI is included in scheduling downlink control information (DCI) of the PDCCH, wherein transmitting the TPMI indicating the selected precoding comprises transmitting, for the UE via the scheduling DCI of the PDCCH, the TPMI indicating the selected precoding.

Aspect 5 is the method of any of aspects 1 to 4, further comprising: receiving, from the UE, the set of PUSCH DMRS in a previous uplink (UL) transmission window, wherein performing the channel sounding for the channel is based on the reception of the set of PUSCH DMRS in the previous UL transmission window.

Aspect 6 is the method of any of aspects 1 to 5, further comprising: configuring, for the UE, a number of DMRS ports and one or more DMRS parameters for a transmission of the set of PUSCH DMRS based on a capability of the UE for a number of transmission (Tx) ports.

Aspect 7 is the method of any of aspects 1 to 6, further comprising: receiving the set of PUSCH DMRS from each Tx port in the number of Tx ports of the UE without the precoding, such that the set of PUSCH DMRS is used for the channel sounding and a channel estimation for a PUSCH demodulation.

Aspect 8 is the method of any of aspects 1 to 7, further comprising: configuring, for the UE, a PUSCH with non-coherent TPMI based on a lack of a reference PUSCH transmission from the UE or with coherent TPMI based on a presence of the reference PUSCH transmission from the UE.

Aspect 9 is the method of any of aspects 1 to 8, wherein the reference PUSCH transmission from the UE corresponds to a PUSCH transmission from the UE in a previous UL transmission window.

Aspect 10 is the method of any of aspects 1 to 9, wherein the TPMI is a coherent TPMI, wherein the scheduling of the subsequent PUSCH transmission with the coherent TPMI is based on at least one of: a frequency domain resource allocation (FDRA) of a PUSCH being identical between a reference PUSCH transmission and the subsequent PUSCH transmission in terms of a number of physical resource blocks (PRBs) and a PRB location in a bandwidth part (BWP); a modulation coding scheme (MCS) not being changed between the reference PUSCH transmission and the subsequent PUSCH transmission; or a lack of a closed-loop power control command between the reference PUSCH transmission and the subsequent PUSCH transmission.

Aspect 11 is the method of any of aspects 1 to 10, further comprising: configuring, for the UE, at least one uplink (UL) transmission window for coherent UL multiple input multiple output (MIMO) based on a maximum duration of a UL transmission window supported by the UE for the coherent UL MIMO.

Aspect 12 is the method of any of aspects 1 to 11, further comprising: receiving, from the UE, the set of PUSCH DMRS in a PUSCH without data, wherein performing the channel sounding for the channel is based on the reception of the set of PUSCH DMRS in the PUSCH without the data.

Aspect 13 is the method of any of aspects 1 to 12, further comprising: transmitting, to the UE prior to the reception of the set of PUSCH DMRS, an indication that the set of PUSCH DMRS are to be transmitted in the PUSCH without the dat.

Aspect 14 is the method of any of aspects 1 to 13, wherein transmitting the indication comprises transmitting the indication based on a codepoint in a modulation coding scheme (MCS) table or via a flag in downlink control information (DCI).

Aspect 15 is an apparatus for wireless communication at a network entity, including: at least one memory; and at least one processor coupled to the at least one memory and, based at least in part on information stored in the at least one memory, the at least one processor, individually or in any combination, is configured to implement any of aspects 1 to 14.

Aspect 16 is the apparatus of aspect 15, further including at least one of a transceiver or an antenna coupled to the at least one processor.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at a user equipment (UE), comprising: transmitting, to a network entity, a set of physical uplink shared channel (PUSCH) demodulation reference signals (DMRS); receiving, from the network entity via a physical downlink control channel (PDCCH), a transmit precoder matrix indicator (TPMI) indicating a selected precoding, wherein the PDCCH schedules a subsequent PUSCH transmission for the UE; and transmitting, to the network entity, the subsequent PUSCH transmission based on the selected precoding indicated by the TPMI.

Aspect 20 is the method of aspect 19, wherein the TPMI is included in scheduling downlink control information (DCI) of the PDCCH, wherein receiving the TPMI indicating the selected precoding comprises receiving, from the network entity via the scheduling DCI of the PDCCH, the TPMI to use for precoding of the subsequent PUSCH transmission.

Aspect 21 is the method of aspect 19 or aspect 20, further comprising: indicating, to the network entity, a capability of the UE for a number of transmission (Tx) ports; and receiving, from the network entity, a configuration for a number of DMRS ports and one or more DMRS parameters for the transmission of the set of PUSCH DMRS based on the indicated capability.

Aspect 22 is the method of any of aspects 19 to 21, wherein transmitting the set of PUSCH DMRS comprises: transmitting the set of PUSCH DMRS from each Tx port in the number of Tx ports of the UE without the precoding, such that the set of PUSCH DMRS is used in association with a channel sounding for a precoding determination and a channel estimation for a PUSCH demodulation.

Aspect 23 is the method of any of aspects 19 to 22, further comprising: maintaining a power and phase coherency for PUSCH transmissions within an uplink (UL) transmission window, wherein the transmission of the subsequent PUSCH transmission is based on the maintained power and phase coherency.

Aspect 24 is the method of any of aspects 19 to 23, further comprising: maintaining a power and phase coherency for PUSCH transmissions across adjacent UL transmission windows except for a loop control update or a radio frequency (RF) control update, wherein the transmission of the subsequent PUSCH transmission is based on the maintained power and phase coherency.

Aspect 25 is the method of any of aspects 19 to 24, further comprising: breaking the power and phase coherency for the PUSCH transmissions based on the loop control update or the RF control update within a pre-defined allowance, wherein the transmission of the subsequent PUSCH transmission is based on the broken power and phase coherency.

Aspect 26 is the method of any of aspects 19 to 25, further comprising: receiving, from the network entity, a configuration of a system frame number (SFN) and a slot number with a periodicity for breaking the power and phase coherency for the PUSCH transmissions; and applying the loop control update or the RF control update based on the configuration.

Aspect 27 is the method of any of aspects 19 to 26, wherein transmitting the set of PUSCH DMRS comprises transmitting the set of PUSCH DMRS via a PUSCH without data.

Aspect 28 is the method of any of aspects 19 to 27, further comprising: receiving, from the network entity prior to the transmission of the set of PUSCH DMRS, an indication that the set of PUSCH DMRS are to be transmitted in the PUSCH without the data Aspect 29 is the method of any of aspects 19 to 28, wherein receiving the indication comprises receiving the indication based on a codepoint in a modulation coding scheme (MCS) table or via a flag in downlink control information (DCI).

Aspect 30 is the method of any of aspects 19 to 29, further comprising: calculating a transmission (Tx) power for the transmission of the set of PUSCH DMRS via the PUSCH without the data based on a bandwidth and a modulation coding scheme (MCS) associated with the PUSCH without the data.

Aspect 31 is the method of any of aspects 19 to 30, further comprising: determining the MCS based on radio resource configuration (RRC) signaling when the PUSCH without the data is indicated via a codepoint in an MCS table; or determining the MCS based on an MCS field in downlink control information (DCI) when the PUSCH without the data is indicated via a flag in the DCI.

Aspect 32 is an apparatus for wireless communication at a network entity, including: at least one memory; and at least one processor coupled to the at least one memory and, based at least in part on information stored in the at least one memory, the at least one processor, individually or in any combination, is configured to implement any of aspects 19 to 31.

Aspect 33 is the apparatus of aspect 32, further including at least one of a transceiver or an antenna coupled to the at least one processor.

Aspect 34 is an apparatus for wireless communication including means for implementing any of aspects 19 to 31.

Aspect 35 is a computer-readable medium (e.g., a non-transitory computer-readable medium) storing computer executable code, where the code when executed by a processor causes the processor to implement any of aspects 19 to 31.

What is claimed is:

1. A network entity, comprising:

at least one memory; and one or more processors coupled to the at least one memory and, based at least in part on information stored in the at least one memory, the one or more processors, individually or in any combination, are configured to cause the network entity to:

perform channel sounding for a channel based on a set of physical uplink shared channel (PUSCH) demodulation reference signals (DMRS) corresponding to a reference PUSCH transmission received from a user equipment (UE) via the channel;

select a precoding to be used by the UE for a subsequent PUSCH transmission via the channel based on the channel sounding; and transmit, for the UE via a physical downlink control channel (PDCCH), a transmit precoder matrix indicator (TPMI) indicating the selected precoding, wherein the TPMI is a non-coherent TPMI based on a lack of the reference PUSCH transmission from the UE or the TPMI is a coherent TPMI based on a presence of the reference PUSCH transmission from the UE, and wherein the PDCCH schedules the subsequent PUSCH transmission for the UE.

2. The network entity of claim 1, wherein the one or more processors, individually or in any combination, are further configured to cause the network entity to:
    receive, from the UE based on the PDCCH, the subsequent PUSCH transmission with the precoding according to the TPMI.

3. The network entity of claim 1, wherein the one or more processors, individually or in any combination, are further configured to cause the network entity to:
    perform a channel estimation for a PUSCH demodulation based on non-precoded DMRS and the TPMI.

4. The network entity of claim 1, wherein the TPMI is included in scheduling downlink control information (DCI) of the PDCCH, wherein to transmit the TPMI indicating the selected precoding, the one or more processors, individually or in any combination, are configured to cause the network entity to transmit, for the UE via the scheduling DCI of the PDCCH, the TPMI indicating the selected precoding.

5. The network entity of claim 1, wherein the one or more processors, individually or in any combination, are further configured to cause the network entity to:
    receive, from the UE, the set of PUSCH DMRS in a previous uplink (UL) transmission window, wherein the performance of the channel sounding for the channel is based on the reception of the set of PUSCH DMRS in the previous UL transmission window.

6. The network entity of claim 1, wherein the one or more processors, individually or in any combination, are further configured to cause the network entity to:
    configure, for the UE, a number of DMRS ports and one or more DMRS parameters for a transmission of the set of PUSCH DMRS based on a capability of the UE for a number of transmission (Tx) ports.

7. The network entity of claim 6, wherein the one or more processors, individually or in any combination, are further configured to cause the network entity to:
    receive the set of PUSCH DMRS from each Tx port in the number of Tx ports of the UE without the precoding, such that the set of PUSCH DMRS is used for the channel sounding and a channel estimation for a PUSCH demodulation.

8. The network entity of claim 1, wherein the reference PUSCH transmission from the UE corresponds to a PUSCH transmission from the UE in a previous UL transmission window.

9. The network entity of claim 1, wherein the TPMI is a coherent TPMI, wherein the scheduling of the subsequent PUSCH transmission with the coherent TPMI is based on at least one of:
    a frequency domain resource allocation (FDRA) of a PUSCH being identical between a reference PUSCH transmission and the subsequent PUSCH transmission in terms of a number of physical resource blocks (PRBs) and a PRB location in a bandwidth part (BWP);
    a modulation coding scheme (MCS) not being changed between the reference PUSCH transmission and the subsequent PUSCH transmission; or
    a lack of a closed-loop power control command between the reference PUSCH transmission and the subsequent PUSCH transmission.

10. The network entity of claim 1, wherein the one or more processors, individually or in any combination, are further configured to cause the network entity to:
    receive, from the UE, the set of PUSCH DMRS in a PUSCH without data, wherein performing the channel sounding for the channel is based on the reception of the set of PUSCH DMRS in the PUSCH without the data.

11. The network entity of claim 10, wherein the one or more processors, individually or in any combination, are further configured to cause the network entity to:
    transmit, to the UE prior to the reception of the set of PUSCH DMRS, an indication that the set of PUSCH DMRS are to be transmitted in the PUSCH without the data.

12. The network entity of claim 11, further comprising a transceiver coupled to the one or more processors, wherein to transmit the indication, the one or more processors, individually or in any combination, are configured to cause the network entity to transmit, via the transceiver, the indication based on a codepoint in a modulation coding scheme (MCS) table or via a flag in downlink control information (DCI).

13. A method of wireless communication at a network entity, comprising:
    performing channel sounding for a channel based on a set of physical uplink shared channel (PUSCH) demodulation reference signals (DMRS) corresponding to a reference PUSCH transmission received from a user equipment (UE) via the channel;
    selecting a precoding to be used by the UE for a subsequent PUSCH transmission via the channel based on the channel sounding; and
    transmitting, for the UE via a physical downlink control channel (PDCCH), a transmit precoder matrix indicator (TPMI) indicating the selected precoding, wherein the TPMI is a non-coherent TPMI based on a lack of the reference PUSCH transmission from the UE or the TPMI is a coherent TPMI based on a presence of the reference PUSCH transmission from the UE, and wherein the PDCCH schedules the subsequent PUSCH transmission for the UE.

14. A user equipment (UE), comprising:
    at least one memory; and
    one or more processors coupled to the at least one memory and, based at least in part on information stored in the at least one memory, the one or more processors, individually or in any combination, are configured to cause the UE to:
    transmit, to a network entity, a set of physical uplink shared channel (PUSCH) demodulation reference signals (DMRS) in a reference PUSCH transmission;
    receive, from the network entity via a physical downlink control channel (PDCCH), a transmit precoder matrix indicator (TPMI) indicating a selected precoding, wherein the TPMI is a non-coherent TPMI based on a lack of the reference PUSCH transmission or the TPMI is a coherent TPMI based on a presence of the reference PUSCH transmission, and wherein the PDCCH schedules a subsequent PUSCH transmission for the UE; and
    transmit, to the network entity, the subsequent PUSCH transmission based on the selected precoding indicated by the TPMI.

15. The UE of claim 14, wherein the TPMI is included in scheduling downlink control information (DCI) of the PDCCH, wherein to receive the TPMI indicating the selected precoding, the one or more processors, individually or in any combination, are configured to cause the UE to receive, from the network entity via the scheduling DCI of the PDCCH, the TPMI to use for precoding of the subsequent PUSCH transmission.

16. The UE of claim 14, wherein the one or more processors, individually or in any combination, are further configured to cause the UE to:

indicate, to the network entity, a capability of the UE for a number of transmission (Tx) ports; and receive, from the network entity, a configuration for a number of DMRS ports and one or more DMRS parameters for the transmission of the set of PUSCH DMRS based on the indicated capability.

17. The UE of claim 16, wherein to transmit the set of PUSCH DMRS, the one or more processors, individually or in any combination, are configured to cause the UE to:

transmit the set of PUSCH DMRS from each Tx port in the number of Tx ports of the UE without the precoding, such that the set of PUSCH DMRS is used in association with a channel sounding for a precoding determination and a channel estimation for a PUSCH demodulation.

18. The UE of claim 14, wherein the one or more processors, individually or in any combination, are further configured to cause the UE to:

maintain a power and phase coherency for PUSCH transmissions within an uplink (UL) transmission window, wherein the transmission of the subsequent PUSCH transmission is based on the maintained power and phase coherency.

19. The UE of claim 14, wherein the one or more processors, individually or in any combination, are further configured to cause the UE to:

maintain a power and phase coherency for PUSCH transmissions across adjacent UL transmission windows except for a loop control update or a radio frequency (RF) control update, wherein the transmission of the subsequent PUSCH transmission is based on the maintained power and phase coherency.

20. The UE of claim 19, wherein the one or more processors, individually or in any combination, are further configured to cause the UE to:

break the power and phase coherency for the PUSCH transmissions based on the loop control update or the RF control update within a pre-defined allowance, wherein the transmission of the subsequent PUSCH transmission is based on the broken power and phase coherency.

21. The UE of claim 19, wherein the one or more processors, individually or in any combination, are further configured to cause the UE to:

receive, from the network entity, a configuration of a system frame number (SFN) and a slot number with a periodicity for breaking the power and phase coherency for the PUSCH transmissions; and apply the loop control update or the RF control update based on the configuration.

22. The UE of claim 14, wherein to transmit the set of PUSCH DMRS, the one or more processors, individually or in any combination, are configured to cause the UE to transmit the set of PUSCH DMRS via a PUSCH without data.

23. The UE of claim 22, wherein the one or more processors, individually or in any combination, are further configured to cause the UE to:

receive, from the network entity prior to the transmission of the set of PUSCH DMRS, an indication that the set of PUSCH DMRS are to be transmitted in the PUSCH without the data.

24. The UE of claim 23, wherein to receive the indication, the one or more processors, individually or in any combination, are configured to cause the UE to receive the indication based on a codepoint in a modulation coding scheme (MCS) table or via a flag in downlink control information (DCI).

25. The UE of claim 22, wherein the one or more processors, individually or in any combination, are further configured to cause the UE to:

calculate a transmission (Tx) power for the transmission of the set of PUSCH DMRS via the PUSCH without the data based on a bandwidth and a modulation coding scheme (MCS) associated with the PUSCH without the data.

26. The UE of claim 25, wherein the one or more processors, individually or in any combination, are further configured to cause the UE to:

determine the MCS based on radio resource configuration (RRC) signaling when the PUSCH without the data is indicated via a codepoint in an MCS table; or determine the MCS based on an MCS field in downlink control information (DCI) when the PUSCH without the data is indicated via a flag in the DCI.

27. The UE of claim 14, further comprising a transceiver coupled to the one or more processors, wherein to transmit the set of PUSCH DMRS, the one or more processors, individually or in any combination, are configured to cause the UE to transmit the set of PUSCH DMRS via the transceiver; wherein to receive the TPMI, the one or more processors, individually or in any combination, are configured to cause the UE to receive the TPMI via the transceiver; wherein to transmit the subsequent PUSCH transmission, the one or more processors, individually or in any combination, are configured to cause the UE to transmit the subsequent PUSCH transmission via the transceiver.

28. A method of wireless communication at a user equipment (UE), comprising:

transmitting, to a network entity, a set of physical uplink shared channel (PUSCH) demodulation reference signals (DMRS) in a reference PUSCH transmission;

receiving, from the network entity via a physical downlink control channel (PDCCH), a transmit precoder matrix indicator (TPMI) indicating a selected precoding, wherein the TPMI is a non-coherent TPMI based on a lack of the reference PUSCH transmission or the TPMI is a coherent TPMI based on a presence of the reference PUSCH transmission, and wherein the PDCCH schedules a subsequent PUSCH transmission for the UE; and transmitting, to the network entity, the subsequent PUSCH transmission based on the selected precoding indicated by the TPMI.

* * * * *